(12) United States Patent
Garthwaite et al.

(10) Patent No.: US 7,089,272 B1
(45) Date of Patent: Aug. 8, 2006

(54) SPECIALIZING WRITE-BARRIERS FOR OBJECTS IN A GARBAGE COLLECTED HEAP

(75) Inventors: Alexander T. Garthwaite, Beverly, MA (US); David L. Detlefs, Westford, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 395 days.

(21) Appl. No.: 10/464,371

(22) Filed: Jun. 18, 2003

(51) Int. Cl.
*G06F 17/30* (2006.01)

(52) U.S. Cl. .................. 707/206; 707/100; 707/103 R

(58) Field of Classification Search ................ 707/203, 707/205, 206, 100, 103 R
See application file for complete search history.

(56) References Cited

U.S. PATENT DOCUMENTS

| | | | |
|---|---|---|---|
| 4,724,521 A | 2/1988 | Carron et al. | |
| 4,797,810 A | 1/1989 | McEntee et al. | |
| 4,912,629 A | 3/1990 | Shuler, Jr. | |
| 4,989,134 A | 1/1991 | Shaw | |
| 5,088,036 A | 2/1992 | Ellis et al. | |
| 5,333,318 A | 7/1994 | Wolf | |
| 5,392,432 A | 2/1995 | Engelstad et al. | |
| 5,485,613 A | 1/1996 | Engelstad et al. | |
| 5,560,003 A | 9/1996 | Nilson et al. | |
| 5,687,370 A | 11/1997 | Garst et al. | |
| 5,801,943 A | 9/1998 | Nasburg | |
| 5,845,276 A | 12/1998 | Emerson et al. | |
| 5,845,298 A | 12/1998 | O'Connor et al. | |
| 5,857,210 A | 1/1999 | Tremblay et al. | |
| 5,873,104 A | 2/1999 | Tremblay et al. | |
| 5,873,105 A | 2/1999 | Tremblay et al. | |
| 5,900,001 A | 5/1999 | Wolczko et al. | |
| 5,903,900 A | 5/1999 | Knippel et al. | |
| 5,930,807 A | 7/1999 | Ebrahim et al. | |
| 5,953,736 A | 9/1999 | O'Connor et al. | |
| 5,960,087 A | 9/1999 | Tribble et al. | |
| 5,999,974 A | 12/1999 | Ratcliff et al. | |
| 6,021,415 A | 2/2000 | Cannon et al. | |

(Continued)

FOREIGN PATENT DOCUMENTS

EP  0 969 377 A1  1/2000

(Continued)

OTHER PUBLICATIONS

Richard Jones, et al., Garbage Collection: Algorithms for Automatic Dynamic Memory Management, 1996, John Wiliey & Sons Ltd., England.

(Continued)

*Primary Examiner*—Greta Robinson
*Assistant Examiner*—Cheryl Lewis
(74) *Attorney, Agent, or Firm*—Kudirka & Jobse, LLP

(57) ABSTRACT

A technique is provided for reducing the number of write barriers executed in mutator code without compromising garbage collector performance. Advantageously, a compiler generates two forms of a mutator code—a first version with write barriers and a second version substantially without write barriers. In operation, the first version of the code may be accessed by a vtable in a "mature" near-class and the second version may be accessed by a vtable in a "nascent" near-class. According to the invention, mapping of functionally equivalent points in the first and second versions of the mutator code may be facilitated by an associated pcmap. Further, each of the first and second versions may also be associated with a respective nr_map that facilitates mapping functionally equivalent points within different branches of guard code sequences corresponding to reference-writes to non-receiver objects.

35 Claims, 20 Drawing Sheets

U.S. PATENT DOCUMENTS

| | | | |
|---|---|---|---|
| 6,047,125 | A | 4/2000 | Agesen et al. |
| 6,049,390 | A | 4/2000 | Notredame et al. |
| 6,049,810 | A * | 4/2000 | Schwartz et al. ........... 707/206 |
| 6,065,020 | A | 5/2000 | Dussud |
| 6,098,089 | A | 8/2000 | O'Connor et al. |
| 6,148,309 | A | 11/2000 | Azagury et al. |
| 6,148,310 | A | 11/2000 | Azagury et al. |
| 6,173,294 | B1 | 1/2001 | Azagury et al. |
| 6,185,581 | B1 | 2/2001 | Garthwaite |
| 6,226,653 | B1 | 5/2001 | Alpern et al. |
| 6,243,720 | B1 | 6/2001 | Munter et al. |
| 6,260,120 | B1 | 7/2001 | Blumenau et al. |
| 6,289,358 | B1 | 9/2001 | Mattis et al. |
| 6,308,185 | B1 | 10/2001 | Grarup et al. |
| 6,314,436 | B1 | 11/2001 | Houldsworth |
| 6,321,240 | B1 | 11/2001 | Chilimbi et al. |
| 6,353,838 | B1 | 3/2002 | Sauntry et al. |
| 6,381,738 | B1 | 4/2002 | Choi et al. |
| 6,393,439 | B1 | 5/2002 | Houldsworth et al. |
| 6,424,977 | B1 | 7/2002 | Garthwaite |
| 6,434,576 | B1 | 8/2002 | Garthwaite |
| 6,434,577 | B1 | 8/2002 | Garthwaite |
| 6,442,661 | B1 | 8/2002 | Dreszer |
| 6,449,626 | B1 | 9/2002 | Garthwaite et al. |
| 6,496,871 | B1 | 12/2002 | Jagannathan et al. |
| 6,529,919 | B1 | 3/2003 | Agesen et al. |
| 6,567,905 | B1 | 5/2003 | Otis |
| 6,640,278 | B1 | 10/2003 | Nolan et al. |
| 6,757,890 | B1 | 6/2004 | Wallman |
| 6,769,004 | B1 | 7/2004 | Barrett |
| 6,820,101 | B1 | 11/2004 | Wallman |
| 6,826,583 | B1 | 11/2004 | Flood et al. |
| 6,868,488 | B1 | 3/2005 | Garthwaite |
| 6,892,212 | B1 | 5/2005 | Shuf et al. |
| 6,928,450 | B1 | 8/2005 | Mogi et al. |
| 6,931,423 | B1 * | 8/2005 | Sexton et al. ............... 707/205 |
| 2002/0032719 | A1 | 3/2002 | Thomas et al. |
| 2002/0095453 | A1 | 7/2002 | Steensgaard |
| 2002/0133533 | A1 | 9/2002 | Czajkowski et al. |
| 2002/0138506 | A1 * | 9/2002 | Shuf et al. .................. 707/206 |
| 2003/0088658 | A1 | 5/2003 | Davies et al. |
| 2003/0200392 | A1 * | 10/2003 | Wright et al. ............... 711/118 |
| 2003/0217027 | A1 | 11/2003 | Farber et al. |
| 2004/0010586 | A1 | 1/2004 | Burton et al. |
| 2004/0039759 | A1 | 2/2004 | Detlefs et al. |
| 2004/0215914 | A1 * | 10/2004 | Dussud ....................... 711/173 |

FOREIGN PATENT DOCUMENTS

WO        WO0188713 A2    11/2001

OTHER PUBLICATIONS

Steffen Grarup, et al., Incremental Mature Garbage Collection: M.Sc. Thesis, Aug. 1993, Aarhus Univerisity, Computer Science Department, Denmark.
Paul R. Wilson, Uniprocessor Garbage Collection Techniques [Submitted to ACM Computing Surveys], pp. 1-67.
Richard L. Hudson, et al., Incremental Collection of Mature Objects, University Computing Services, University of Massachusetts, Amherst, Massachusetts.
Jacob Seligmann, et al., Incremental Mature Garbage Collection Using the Train Algorithm, Computer Science Department, Aarhus University, Denmark.
Antony L. Hosking, et al., Protection Traps and Alternatives for Memory Management of an Object-Oriented Language, pp. 1-14, Object Systems Labratory, Department of Computer Science, University of Massachusetts, Amherst, Massachusetts.
Antony L. Hosking, et al., A Comparative Performance Evaluation of Write Barrier implementations, pp. 92-107, Object Systems Labratory, Department of Computer Science, University of Massachusetts, Amherst, Massachusetts.
Henry Lieberman, et al., A Real-Time Garbage Collector Based on the Lifetimes of Objects, 1983, MIT Artificial Intelligence Labratory.
David Ungar, Generation Scavenging: A Non-disruptive High Performance Storage Reclamation Algorithm, 1984, pp. 157-167, Computer Science Division, Department of Electrical Engineering and Computer Sciences, University of California, Berkley, California.
Andrew W. Appel, Simple Generational Garbage Collection and Fast Allocation, Mar. 1988, revised Sep. 1988, Department of Computer Science, Princeton University, Princeton, New Jersey.
Richard Hudson, et al., Adaptive Garbage Collection for Modula-3 and Smalltalk, Oct. 27, 1990, pp. 1-5, Object Oriented Systems Laboratory, Department of Computer and Information Science, University of Massachusetts, Amherst, Massachusetts.
Antony L. Hosking, Remembered Sets Can Also Play Cards, pp. 1-8, Object Systems Laboratory, Department of Computer Science, University of Massachusetts, Amherst, Massachusetts.
Patrick G. Sobalvarro, A Lifetime-Based Garbage Collector for LISP Systems on General-Purpose Computers, Sep. 1988, pp. 1-59, Department of Electrical Engineering and Computer Science at the Massachusetts Institute of Technology.
Pekka P. Pirinen, Barrier Techniques for Incremental Tracing, pp. 20-25, Harlequin Limited, Barrington Hall, Barrington, Cambridge CB2 5 RG, UK.
P. T. Withington, How Real is "Real-Time" GC?, Oct. 6, 1991, Symbolics, Inc., Burlington, Massachusetts.
Urs Holzle, A Fast Write Barrier for Generational Garbage Collectors, Oct. 1993, pp. 1-6, Computer Systems Laboratory, Stanford University, California.
Benjamin Zorn, Barrier Methods for Garbage Collection, Nov. 1990, pp. 1-37, Department of Computer Science, University of Colorado at Boulder, Boulder, Colorado.
Richard L. Hudson et al., Sapphire: Copying GC Without Stopping the World, Concurrency and Computation: Practice and Experience Special Issue: Java Grande/ISCOPE.
Scott Nettles, et al., Real-Time Replication Garbage Collection, Avionics Lab, Wright research and Development Center, Aeronautical Systems Division (AFSC), U.S. Air Force, Wright Patterson AFB, Ohio.
U.S. Appl. No. 10/287,851, filed Nov. 5, 2002, Garthwaite, et al.
Arora, et al., "Thread Scheduling for Multiprogrammed Multiprocessors", Proceedings of the 10th Annual ACM Symposium on Parallel Algorithms and Architecture, Jun. 1998.
Bacon, et al., "Java without the Coffee Breaks: A nonintrusive Multiprocessor Garbage Collector", SIGPLAN Conference on Programming Language Design and Implementation, Jun. 2001, Snowbird, UT.
Baker, "List Processing in Real Time on a Serial Computer", Communications of the ACM 21, Apr. 1978, 280-294.
Barrett, et al., "Using Lifetime Predictors to Improve Memory Allocation Performance", SIGPLAN'93 Conference on Programming Languages Design and Implementation vol. 28(6) of Notices, Jun. 1993, 187-196, ACM Press, Albuquerque, NM.

Blackburn & McKinley, "In or Out? Putting Write Barriers in Their Place", Jun. 20, 2002, Berlin.

Chilimbi, et al., "Using Generational Garbage Collection to Implement Cache-Conscious Data Placement", International Symposium on Memory Management, Oct. 1998.

Clark, "An Efficient List-Moving Algorithm Using Constant Workspace, vol. 19 No. 6", Communications of the ACM, Jun. 1976, 352-354.

Clark, et al., "Compacting Garbage Collection can be Fast and Simple", Software-Practice and Experience, vol. 26, No. 2, Feb. 1996, 177-194.

Flood, et al., "Parallel Garbage Collection for Shared Memory Multiprocessors", USENIX JVM Conference, Apr. 2001.

Goldstein, et al., "Lazy Threads: Implementing a Fast Parallel Call, vol. 37, No. 1", Journal of Parallel and Distributed Computing, Aug. 1996, 5-20.

Hanson, "Fast Allocation and Deallocation of Memory Based on Object Lifetimes,", Software Practice and Experience, Jan. 1990, 20(1):5-12.

Harris, "Dynamic Adaptive Pre-Tenuring", In Proceedings of the Int'l Symposium on Memory Management, Oct. 2000, 127-136.

Herlihy, et al., "Lock-Free Garbage Collection for Multiprocessors", ACM SPAA, 1991, 229-236.

Hudson, et al., "A Language—Independent Garbage Collector Toolkit", Coins Techincal Report, Sep. 1991.

Hudson, et al., "Training Distributed Garbage: The DMOS Collector", University of St. Andrews Tech Report, 1997, 1-26.

Hudson, et al., "Garbage Collecting the World: One Car at a Time", ACM SIGPLAN Notices 32, 1997, 162-175.

Liskov, et al., "Partitioned Garbage Collection of a Large Stable Heap", Proceedings of IWOOOS, 1996, 117-121.

Moss, et al., "A Complete and Coarse-Grained Incremental Garbage Collection for Persisten Object Strores", Proceedings 7th Int'l Workshop on Persisten Object System, 1996, 1-13, Cape May, NJ.

Munro, et al., "Incremental Garbage Collection of a Persistent Object Store using PMOS", 3rd Int'l Workshop on Persistence and Java, 1998, 78-91, Tiburon, California.

Padopoulos, "Hood: A User-Level Thread Library for Multiprogramming Multiprocessors, Thesis: The Uni. of TX", University of Texas, Aug. 1998, 1-71, Austin.

Roy, et al., "Garbage Collection in Object-Oriented Databases Using Transactional Cyclic Reference Counting", VLDB Journal—The International Journal on Very Large Da Bases, vol. 7, Issue 3, 1998, 179-193.

Shuf, et al., "Exploiting Profilic Types for Memory Management and Optimizations. ACM ISBN Sep. 2, 2001", POPL, Jan. 2002, Portland.

Ungar, et al., "Tenuring Policies for Generation-Based Storage Reclamation", ACM SIGPLAN Notices, 1988, 23(11)1-17.

Venners, "Garbage Collection, Inside the Java 2 Virtual Machine; Chapter 9", www.artima.com, Date Unknown, pp. 1-18.

Wilson, "Uniprocessor Garbage Collection Techniques", Technical Report, University of Texas, 1994.

Zee, et al., "Write Barrier Removal by Static Analysis", OOPSLA '02, Nov. 2002.

Zorn, "Segregating Heap Objects by Reference Behavior and Lifetime", In 8th Int'l Conferenceon Architectural Support for Programming Languages and Operating Systems, Oct. 1998, 12-32, San Jose, CA.

Azagury, et al., "Combining Card Marking With Remembered Sets: How to Save Scanning Time", ACM SIGPLAN Notices, Oct. 1998, V. 34(3), ACM Press, Vancouver, Canada.

Cheney, "A Nonrecursive List Compacting Algorithm, vol. 13, No. 11", Communications of the ACM, Nov. 1970, 677-678, Uni. Math. Lab., Cambridge, European Patent Office.

Cheng, et al., "Generational Stack Collection and Profile-Driven Pretenuring", SIGPLAN'98 Conference on Programming Languages Design and Implementation, Jun. 1998, 162-173, ACM PRESS, Montreal, Canada.

Lam, et al., "Object Type Directed Garbage Collection to Improve Locality", Proceedings of the International Workshop on Memory Management, Sep. 1992, 404-425, St. Malo, France.

Lam, et al., "Effective Static-Graph Reorganization to Improve Locality in Garbage Collected Systems", Proceedings of ACM SIGPLAN Conference on Programming Language Design and Implementation, Jun. 1991, Toronto, Canada.

Wilson, et al., "Effective Static-Graph Reorganization to Improve Locality in Garbage Collected Systems", Proceedings of ACM SIGPLAN Conference on Programming Language Design and Implementation, Jun. 1991, Canada.

* cited by examiner

```
1   /* Mature Object O is modified by a write operation */
2   /* Register_1 stores O's starting address*/
3   /* Register_2 stores a value that will modify O*/
4   /* Register_3 stores the adjusted base address of a card table*/
5   /* Register_4 is a "working" register*/
6   /*Log_card_size is a base_2 log card size*/
7   /* C is the offset of the field modified in O*/
8   /* Mutator code begins */
                    ⋮
N     /* Object is modified in a mutator code*/
N +1      STW Register_2, (Register_1 + C)
N +2  /* Write barrier code */
N +3      ADD Register_1, C, Register_4
N +4      SRL Register_4, log_card_size, Register_4
N +5      STB 0, (Register_3 + Register_4)
N +6  /* Mutator code continues */
                    ⋮
```

FIG. 10

```
1    /* MODIFY REFERENCE IN NON-RECEIVER OBJECT X */
2        Class C {
3            public Object f
4            public Object g
5            public void foo (C x) {
6                x.f=g;
7            }
8        }
```

FIG. 17

```
1   /* Non-receiver object x is modified by a write operation            */
2   /* Register_1 stores x's near-class pointer value                    */
3   /* Register_2 stores a reference value ref that will modify x        */
4   /* Register_3 stores the adjusted base address of a card table       */
5   /* Register_4 is a "working" register                                */
6   /* Register_5 stores the memory address of a newly allocated object  */
7   /*Log_card_size is a base_2 log card size                            */
8   /* C is the offset of the field f modified in object x               */
9   /* D is the offset of the field g modified in object x               */
10              /* Mutator code begins */
                        ⋮

N              /* "x.f=ref;" */
N+1                 STW Register_2, (Register_1 + C)
N+2            /* Guard code begins */
N+3                 ANDCC Register_1, 0x04, 0
N+4                 BRZ    Is_nascent
N+5                 NOP
N+6            /* "x.g=new Object();" */
N+7                 CALL newInstance_object
N+8                 STW Register_5, (Register_1 + D)
N+9            /* Write-barrier code */
N+10                ADD Register_1, C, Register_4
N+11                SRL Register_4, log_card_size, Register_4
N+12                STB 0, (Register_3 + Register_4)
N+13           /* End guard code */
N+14                BA   Continue
N+15  Is_nascent:
N+16           /* "x.g=new Object();" */
N+17                CALL newInstance_object
N+18                STW Register_5, (Register_1 + D)
N+19  Continue:
                        ⋮
```

FIG. 18

SPECIALIZING WRITE-BARRIERS FOR OBJECTS IN A GARBAGE COLLECTED HEAP

FIELD OF THE INVENTION

The present invention is directed to memory management. It particularly concerns what has come to be known as "garbage collection."

BACKGROUND OF THE INVENTION

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

FIG. 1 illustrates an exemplary object 100 comprising a plurality of fields 120 that may store, e.g., data or pointers. Typically, the object is an instance of a class, and at least one of its object fields is a class field dedicated to storing a class pointer 110 that references a class definition 150. The class definition includes, inter alia, the set of methods accessible through the object (via pointer 110) as well as other information such as verification information (e.g., hash values of one or more of the methods), debugging information, line numbers corresponding to the methods, data members, etc. While only a single object is shown in FIG. 1, the class definition may instead be referenced by a plurality of objects.

A class definition often comprises a subset of information that is accessed more frequently than the rest of its contents. This subset of information may be grouped and stored in a near-class definition. The remaining contents of the class definition may be stored in a corresponding far-class definition. FIG. 2 illustrates a typical arrangement for partitioning a class definition into near-class and far-class definitions. Specifically, an object 100 may store a class pointer 110 that addresses a frequently accessed near-class 300. The near-class, in turn, includes a far-class pointer 310 that references the contents of a less frequently accessed far-class 200.

FIG. 3 illustrates the exemplary near-class definition 300 in more detail. The near-class comprises a plurality of fields that store, among other things, a far-class pointer 310, a reference map pointer 320, and a vtable 330. As noted, the far-class pointer addresses a corresponding far-class definition that stores information not frequently accessed. The reference map pointer 320 addresses a data structure (not shown) that stores relative offsets of references within objects belonging to the class with which the near-class 300 is associated. Illustratively, the vtable 330 includes pointers, such as pointers 332–336, corresponding to a set of frequently accessed methods (1 through N).

The invention to be described below is applicable to systems that allocate memory to objects dynamically. Not all systems employ dynamic allocation. In some computer languages, source programs can be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 400 depicted in FIG. 4, for example. Data, and instructions for operating on them, that a microprocessor 410 uses may reside in on-board cache memory or be received from further cache memory 420, possibly through the mediation of a cache controller 430. That controller 430 can in turn receive such data from system read/write memory ("RAM") 440 through a RAM controller 450 or from various peripheral devices through a system bus 460. Additionally, instructions and data may be received from other computer systems via a communication interface 480. The memory space made available to an application program may be "virtual" in the sense that it may actually be considerably larger than RAM 440 provides. So the RAM contents will be swapped to and from a system disk 470.

Additionally, the actual physical operations performed to access some of the most-recently visited parts of the process's address space often will actually be performed in the cache 420 or in a cache on board microprocessor 410 rather than on the RAM 440, with which those caches swap data and instructions just as RAM 440 and system disk 470 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

The use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation. Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference."

A way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable. As used herein, a call stack is a data structure that corresponds to a process or thread and stores state information, such as local variables, register contents and program counter values, associated with nested routines within the process or thread. A call stack is usually thought of as divided into stack frames associated with respective calls of the nested routines.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a root set, e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage collection mechanisms can be implemented by various parts and levels of a computing system. One approach is simply to provide them as part of a batch compiler's output. Consider FIG. 5's simple batch-compiler operation, for example. A computer system executes in accordance with compiler object code and therefore acts as a compiler 500. The compiler object code is typically stored on a medium such as FIG. 4's system disk 470 or some other machine-readable medium, and it is loaded into RAM 440 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others include radio waves, microwaves, and both visible and invisible light.

The input to the compiler is the application source code, and the end product of the compiler process is application object code. This object code defines an application 510, which typically operates on input such as mouse clicks, etc., to generate a display or some other type of output. This object code implements the relationship that the programmer intends to specify by his application source code. In one approach to garbage collection, the compiler 500, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

To get some sense of the variety of system components that can be used to implement garbage collection, consider FIG. 6's example of a more complex way in which various levels of source code can result in the machine instructions that a processor executes. In the FIG. 6 arrangement, the human applications programmer produces source code 610 written in a high-level language. A compiler 620 typically converts that code into "class files." These files include routines written in instructions, called "byte codes" 630, for a "virtual machine" that various processors can be configured to emulate. This conversion into byte codes is almost always separated in time from those codes' execution, so FIG. 6 divides the sequence into a "compile-time environment" 600 separate from a "run-time environment" 640, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 650. That process emulates a virtual machine from whose instruction set the byte codes are drawn. As is true of the compiler 620, the virtual-machine process 650 may be specified by code stored on a local disk or some other machine-readable medium from which it is read into FIG. 4's RAM 440 to configure the computer system to implement the garbage collector and otherwise act as a virtual machine. Again, though, that code's persistent storage may instead be provided by a server system remote from the processor that implements the virtual machine, in which case the code would be transmitted, e.g., electrically or optically to the virtual-machine-implementing processor.

In some implementations, much of the virtual machine's action in executing these byte codes is most like what those skilled in the art refer to as "interpreting," so FIG. 6 depicts the virtual machine as including an "interpreter" 660 for that purpose. In addition to or instead of running an interpreter, many virtual-machine implementations actually compile the byte codes concurrently with the resultant object code's execution, so FIG. 6 depicts the virtual machine as additionally including a "just-in-time" compiler 670. The arrangement of FIG. 6 differs from FIG. 5 in that the compiler 620 for converting the human programmer's code does not contribute to providing the garbage collection function; that results largely from the virtual machine 650's operation.

Those skilled in that art will recognize that both of these organizations are merely exemplary, and many modern systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; this may require determining whether enough free memory space is available to contain the new object and reclaiming space if there is not.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The compiler and its runtime system are designed together so that the compiler "knows" what runtime-system procedures are available in the target computer system and can cause desired operations simply by including calls to procedures that the target system already contains. To represent this fact, FIG. 6 includes block 680 to show that the compiler's output makes calls to the runtime system as well as to the operating system 690, which consists of procedures that are similarly system resident but are not compiler-dependent.

Although the FIG. 6 arrangement is a popular one, it is by no means universal, and many further implementation types can be expected. Proposals have even been made to implement the virtual machine 650's behavior in a hardware processor, in which case the hardware itself would provide some or all of the garbage collection function. In short, garbage collectors can be implemented in a wide range of combinations of hardware and/or software.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage collection approaches rely heavily on interleaving garbage collection steps among mutator steps. In one type of garbage collection approach, for instance, the mutator operation of writing a reference is followed immediately by garbage collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage collector-related instructions into the main mutator process but instead interrupt it from time to time to perform garbage collection intervals, in which the garbage collector finds unreachable objects and reclaims their memory space for reuse. Such an approach will be assumed in discussing FIG. 7's depiction of a simple garbage collection operation. Within the memory space allocated to a given application is a part 720 managed by automatic garbage collection. As used hereafter, all dynamically allocated memory associated with a process or thread will be referred to as its heap. During the course of the application's execution, space is allocated for various objects 702, 704, 706, 708, and 710. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 702 is, by a reference in a root set 700. The root set consists of reference values stored in the mutator's threads' call stacks, the central processing unit (CPU) registers, and global variables outside the garbage collected heap. An object is also reachable if it is referred to, as object 706 is, by another reachable object (in this case, object 702). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 700. For the sake of simplicity, FIG. 7 depicts only one reference from the root set 700 into the heap 720. (Those skilled in the art will recognize that there are many ways to identify references, or at least data contents that may be references.) The collector notes that the root set points to object 702, which is therefore reachable, and that reachable object 702 points to object 706, which therefore is also reachable. But those reachable objects point to no other objects, so objects 704, 708, and 710 are all unreachable, and their memory space may be reclaimed.

To avoid excessive heap fragmentation, some garbage collectors additionally relocate reachable objects. FIG. 8 shows a typical approach for this "copying" type of garbage collection. The heap is partitioned into two halves, hereafter called "semi-spaces." For one garbage collection cycle, all objects are allocated in one semi-space 810, leaving the other semi-space 820 free. When the garbage collection cycle occurs, objects identified as reachable are "evacuated" to the other semi-space 820, so all of semi-space 810 is then considered free. Once the garbage collection cycle has occurred, all new objects are allocated in the lower semi-space 820 until yet another garbage collection cycle occurs, at which time the reachable objects are evacuated back to the upper semi-space 810.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. For example, a garbage-collection cycle may be performed at a natural stopping point in the application, such as when the mutator awaits user input.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations" although this is not necessary in principle. Different portions, or generations, of the heap are subject to different collection policies. New objects are allocated in a "young" generation, and older objects are "promoted" from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 9, which depicts a heap as organized into three generations 920, 940, and 960. Assume that generation 940 is to be collected. The process for this individual generation may be more or less the same as that described in connection with FIGS. 7 and 8 for the entire heap, with one major exception. In the case of a single generation, the root set must be considered to include not only the call stack, registers, and global variables represented by set 900 but also objects in the other generations 920 and 960, which themselves may contain references to objects in generation 940. So pointers must be traced not only from the basic root set 900 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation in the mutator code to record information from which the garbage collector can determine where references were written or may have been since the last collection interval. The write-barrier code may communicate this information directly to the collector or indirectly through other runtime processes. A list of modified references can then be maintained by taking such a list as it existed at the end of the previous collection interval and updating it by inspecting only locations identified by the write barriers as possibly modified since the last collection interval.

One of the many write-barrier implementations commonly used by workers in this art employs what has been referred to as the "card table." FIG. 9 depicts the various generations as being divided into smaller sections, known for this purpose as "cards." Card tables 910, 930, and 950 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. For example, assume reference 924 on card 922 is modified ("dirtied") by the mutator, so a Boolean entry in corresponding card-table entry 905 may be set accordingly. The mutator having thus left a record of where new or modified references may be, the collector may scan the card-table to identify those cards that were marked as having been modified since the last collection interval, and the collector can scan only those identified cards for modified references.

Of course, there are other write-barrier approaches, such as simply having the write barrier add to a list of addresses where references were written. Also, although there is no reason in principle to favor any particular number of generations, and although FIG. 9 shows three, most generational garbage collectors have only two generations, of which one is the young generation and the other is the mature generation. Moreover, although FIG. 9 shows the generations as being of the same size, a more-typical configuration is for the young generation to be considerably smaller. Further, each generation may be dispersed over various address ranges of memory instead of comprising a contiguous block of memory as shown in FIG. 9. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter collect the mature generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so write barriers are typically used to set card-table entries associated with the mature generation to thereby limit the amount of memory the collector searches for modified mature-generation references.

Write barrier code is often inserted into mutator code in close proximity to a corresponding mutator instruction that modifies a reference. In an imprecise card-marking scheme, the write barrier code marks the card-table entry that corresponds to the card in which the modified object begins. In a precise card-marking scheme, the write barrier marks the card-table entry that corresponds to the card in which the modified field is located. FIG. 10 illustrates exemplary write barrier code for precise card-marking that corresponds to a mutator instruction that modifies a reference.

FIG. 10's line N+1 contains an assembly instruction (STW) for storing a word-length value into an object reference field located at an offset C from the object's starting address, while lines N+3 through N+5 illustrate the assembly instruction's corresponding write-barrier code. In this example, the write barrier adds three instructions not originally present in the mutator code: ADD, Shift Right Logical (SRL) and Store Byte (STB) instructions. Specifically, the instruction at line N+3 stores the address of the modified object field in a "working" register, and the instruction at line N+4 divides this address by the card size to determine how many cards into the mature generation the modified field is located. Here, we have assumed the card size is a power of 2 in bytes. Lastly, the instruction at line N+5 marks a card-table entry with a binary "0" corresponding to the card in the mature generation that stores the modified object field. As described, each card-table entry is assumed to have a length of one byte.

As seen with regards to FIG. 10, the inclusion of write barriers after modifying object references increases the amount of mutator code, e.g., by three instructions per reference modification. Clearly, this overhead may significantly increase the mutator's execution time, especially when the mutator code modifies references frequently. So adding write barriers to increase the garbage collector's efficiency tends to compromise the mutator's.

SUMMARY OF THE INVENTION

The present invention provides a technique for reducing the number of write barriers executed in mutator code without compromising garbage collector performance. Advantageously, a compiler generates two versions of a mutator method, where the versions have write-barrier differences. Most typically, one version will include more write barriers than the other. In some cases, though, the number of write barriers may be the same, and they may alert the collector to the same reference modifications, but the two versions' write-barrier approaches may be different. For example, the write-barrier code in each of the two versions may perform different write-barrier operations.

As previously mentioned, objects typically belong to classes, methods may be class members, and most class-member methods can be invoked by reference to an object that is an instance of the class. More specifically, the method's identification in the method call includes a field in the object, which we will refer to as a class field, that is used with other information to find the method's entry point. An object thus used in a method call is referred to as the receiver of that method call, and the method is said to be "called on" that object. In the Java programming language, for instance, the expression "o.m(a)" is used to call method m on receiver object o, passing that method the explicit argument a.

Of particular interest in the present context is the fact that a reference to the receiver object is also—implicitly, in the Java programming language—passed as an argument to the method; most methods modify one or more fields of the receiver objects on which they are called. And some of those fields may contain references, of whose modifications the garbage collector must be kept cognizant.

Accordingly, when a receiver object is located in a first region of memory where the collector relies on a first write-barrier approach, the object's class field stores a first value through which a first method version calls on the receiver object. Notably, the first write-barrier approach may not implement write barriers at all, and the first method version therefore may be devoid of write barriers. Similarly, when the receiver object is located in a second region of memory where the collector relies on a different write-barrier approach than in the first region, the object's class field stores a second value, through which a second method version, having a different write-barrier implementation than the first version, calls on the receiver object.

An object is sometimes "promoted" from one region of memory to another, e.g., based on its relative longevity in the heap. Here, the notion of a memory region may be a logical one and need not coincide with a predefined region in physical memory. The collector may employ a different write-barrier approach in the region of memory into which the object is promoted than in the memory region in which the object originally resides. Accordingly, the promoted object's class-field value may be re-written to a value consistent with the object's new memory region. For instance, if a receiver object is promoted from a first region of memory where the collector relies on a first write-barrier approach to a second region of memory where the collector relies on a different write-barrier approach, the object's class-field value may be changed from a first value to a second value.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 10, previously discussed, is an exemplary source code listing of a write barrier that may be used in accordance with the present invention;

FIG. 17 is an exemplary source code listing of a reference that is modified in a non-receiver object;

FIG. 18 is an exemplary guard code sequence added to the source code listing of FIG. 17;

DETAILED DESCRIPTION OF AN ILLUSTRATIVE EMBODIMENT

A. Reference-Writes to Receiver Objects

In a typical implementation of the invention, the areas in which a garbage collector does not rely on write barriers are those in the youngest generation of a multi-generation heap. The collector completely scans these areas at each garbage-collection interval. On the other hand, in a larger, "mature" generation, the garbage collector relies on write barriers so it may confine its scanning to those locations of the generation in which objects have been modified since the last garbage-collection interval. According to the invention, there are some class members for which the compiler generates two versions—one version that includes one or more write barriers and is used when the receiver object is located in a mature generation, and another version, which is used when the receiver object is located where write barriers are generally not employed, that uses fewer write barriers. The assumption is that receiver objects whose methods lack write barriers are scanned in their entirety.

Figure 1:
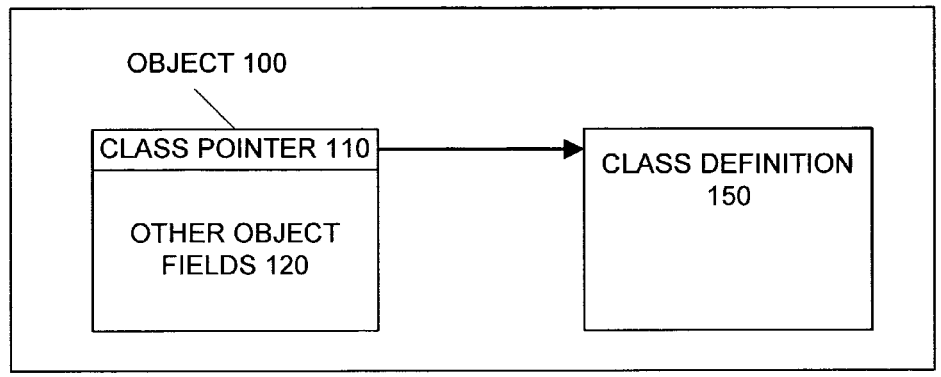
FIG. 1, previously discussed, is a schematic block diagram of an object and its associated class definition.
Figure 2:
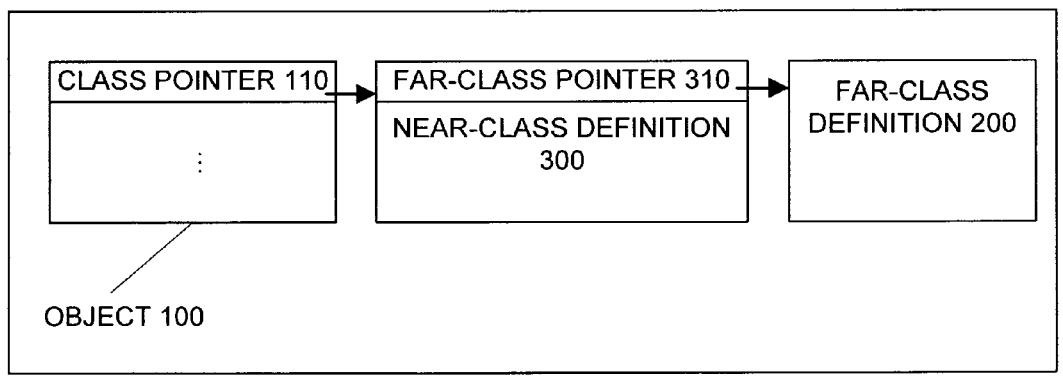
FIG. 2, previously discussed, is a schematic block diagram of an object and its associated near-class and far-class definitions.
Figure 3:
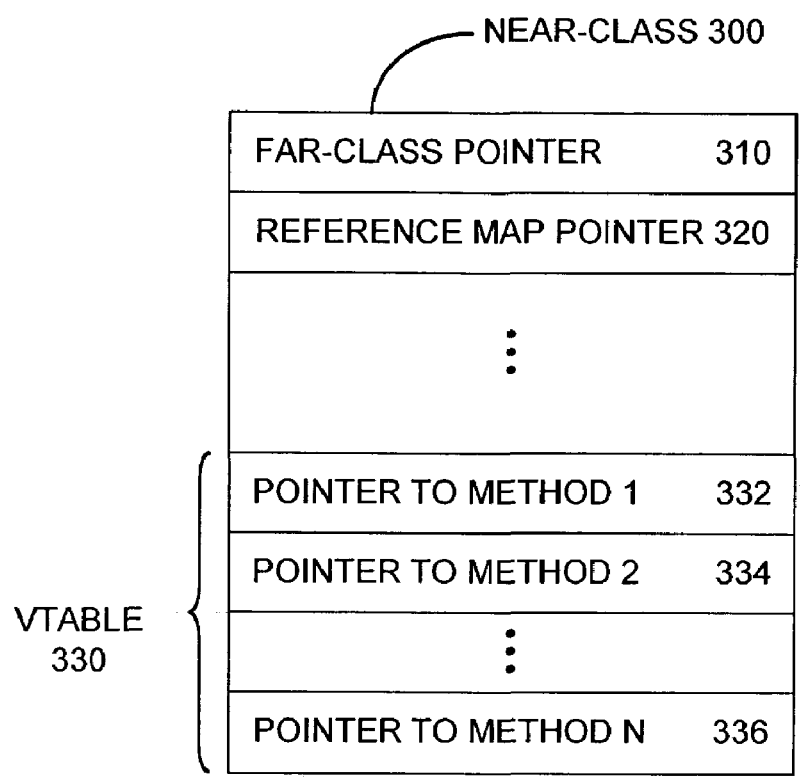
FIG. 3, previously discussed, is a schematic block diagram of an exemplary near-class definition.
Figure 4:
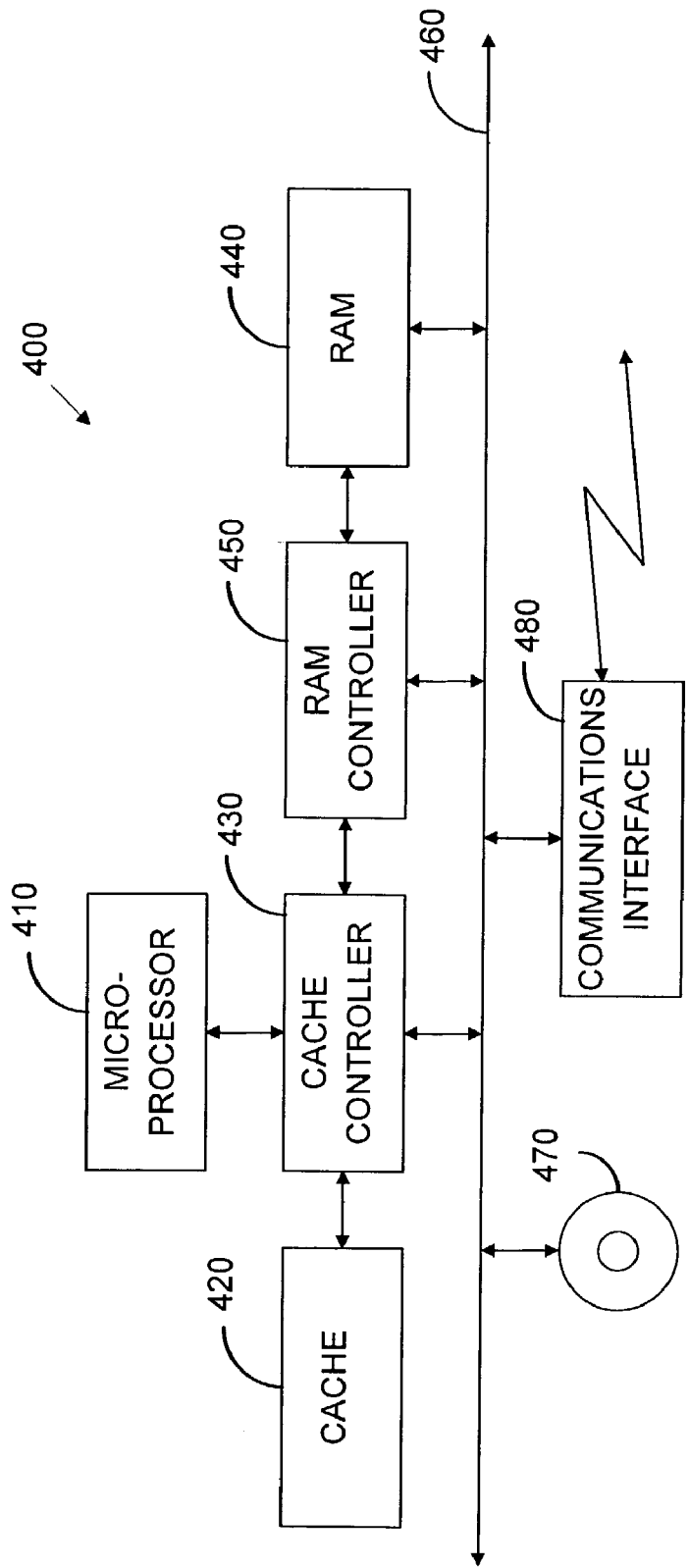
FIG. 4, previously discussed, is a schematic block diagram of a computer system of a type in which the present invention's teachings can be practiced.
Figure 5:
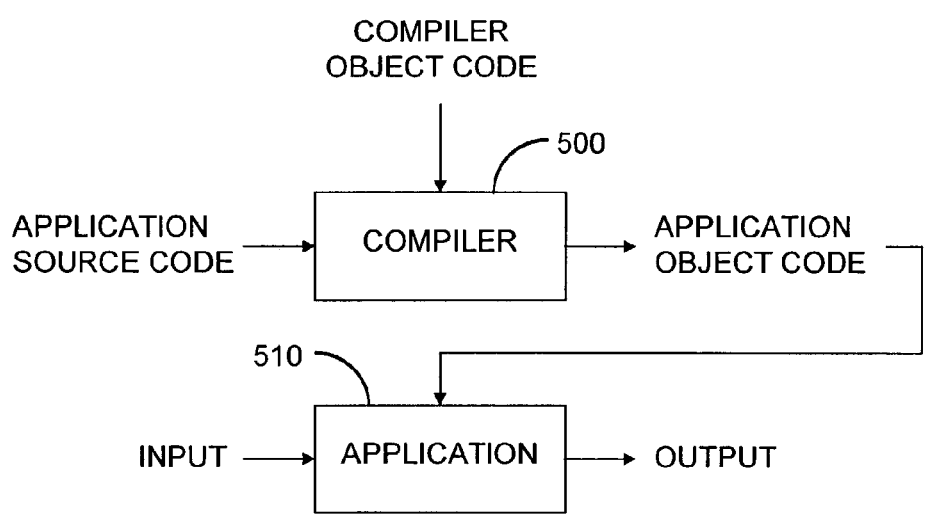
FIG. 5, previously discussed, is a schematic block diagram illustrating a simple source-code compilation operation.
Figure 6:
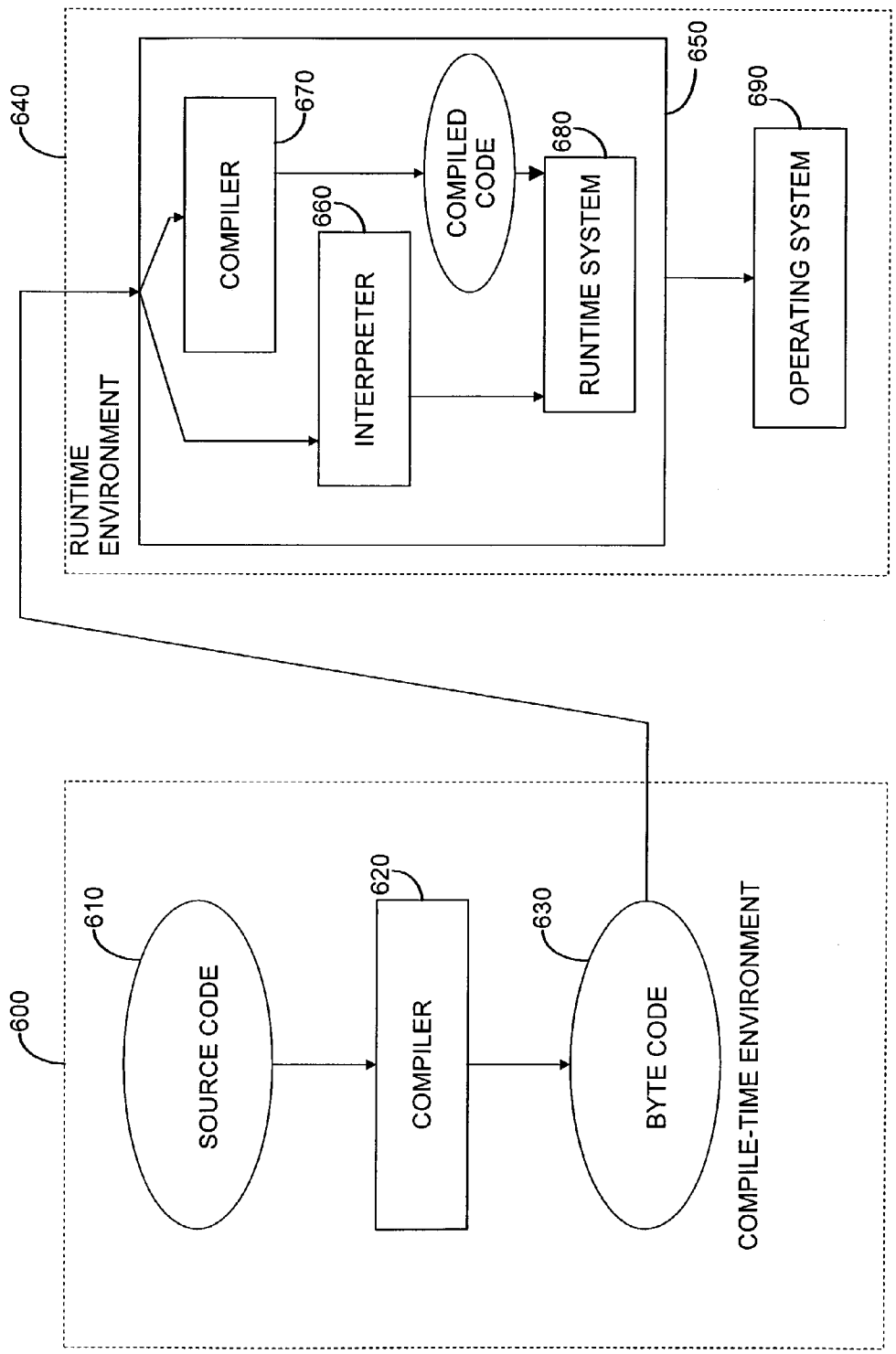
FIG. 6, previously discussed, is a schematic block diagram of a more complex compiler/interpreter organization.
Figure 7:
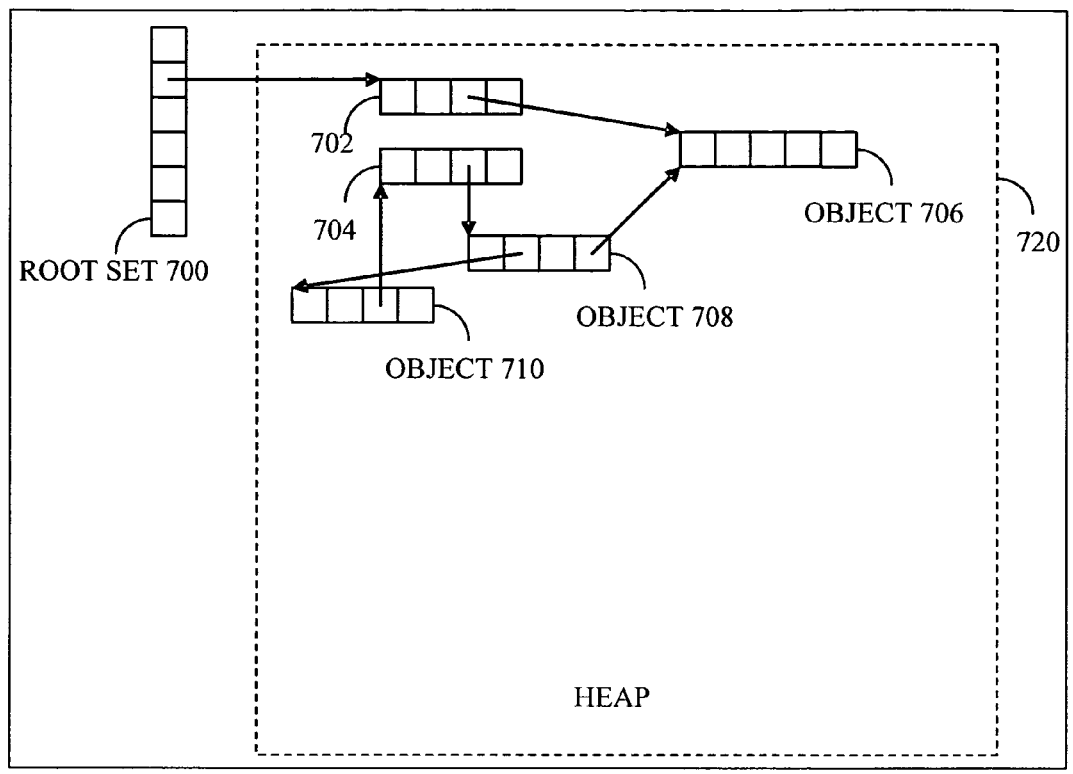
FIG. 7, previously discussed, is a schematic block diagram that illustrates a basic garbage collection mechanism.
Figure 8:
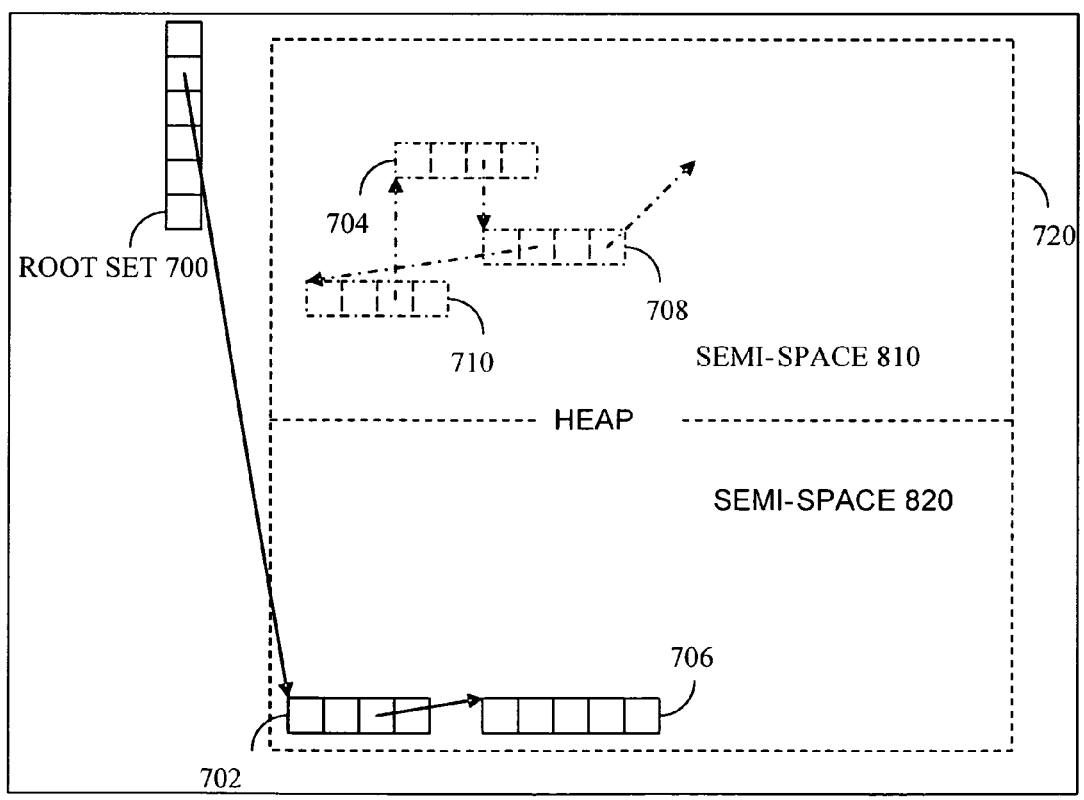
FIG. 8, previously discussed, is a schematic block diagram illustrating an the relocation operation of the garbage collection mechanism of FIG. 7.
Figure 9:
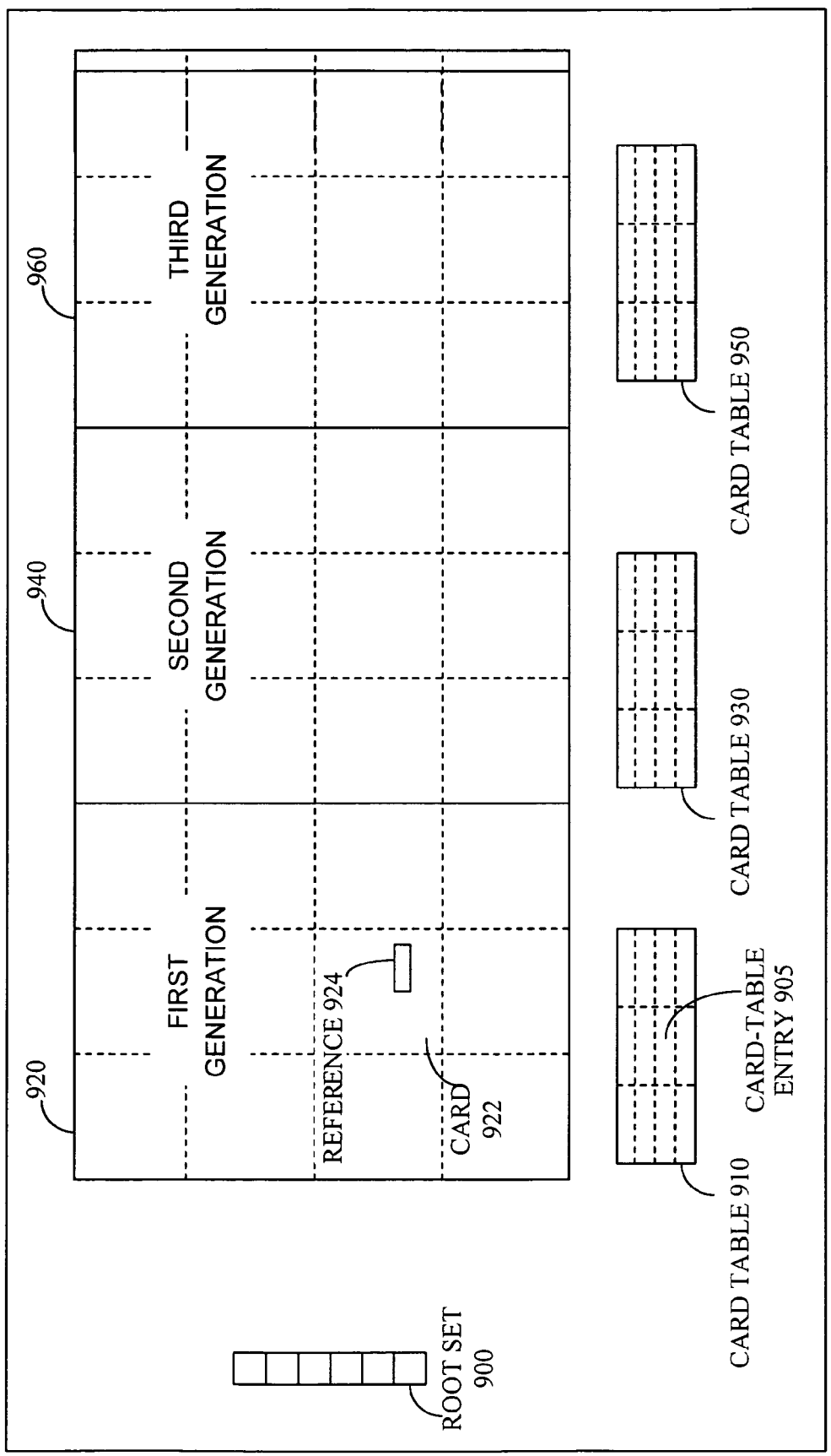
FIG. 9, previously discussed, is a schematic block diagram that illustrates a garbage collected heap's organization into generations.

The different versions may be accessed through respective vtables located in one or more near-class definitions. As previously described in regards to FIG. 2, an object's class definition may be organized in a frequently accessed near-class data structure and a less-frequently accessed far-class structure. Further, it was shown in FIG. 3 that a near-class typically comprises a vtable that stores one or more pointers that reference a set of frequently accessed methods. To implement different versions of the member methods, therefore, one or more "nascent" near-classes may be configured to store pointers to the versions that include relatively few or no write barriers, and one or more "mature" near-classes may be configured to store pointers to the versions of which at least some include write barriers to a larger extent. Thus, young-generation objects may provide access to methods through nascent near-classes, whereas mature-generation objects may provide access to different versions through mature near-classes.

Figure 11:
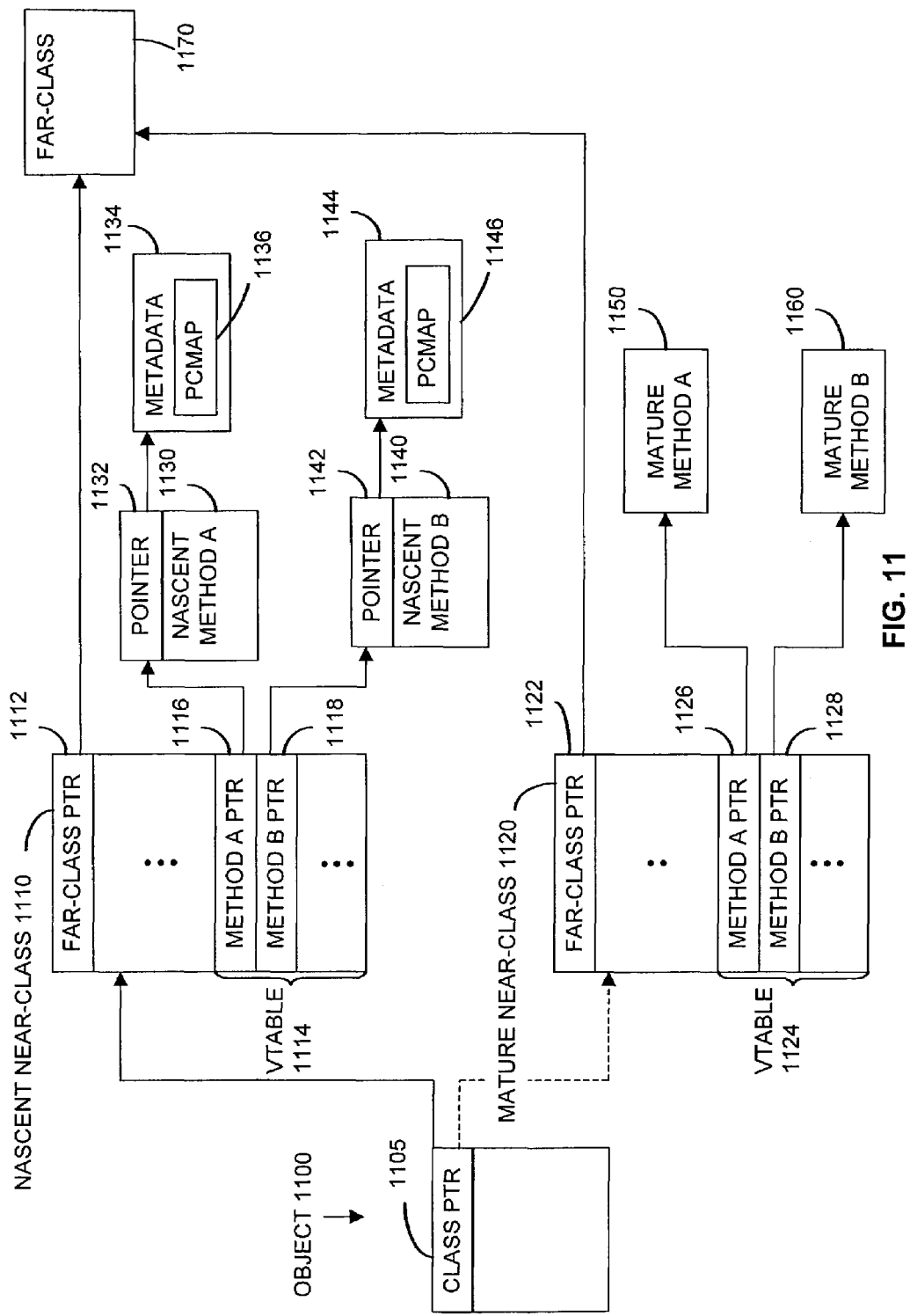
FIG. 11 is a schematic block diagram of an object and its associated class definition organized as a nascent near-class, mature near-class and far-class, as set forth in the invention.

FIG. 11 illustrates an object 1100 comprising a class pointer 1105 that may refer to a nascent near-class 1110 or a mature near-class 1120. The near-classes respectively include pointers 1112 and 1122 to a far-class 1170. The far-class stores information less frequently accessed than the information stored in the near-classes. More specifically, the far-class may store, inter alia, debugging information, line number information, verification information, and other static information. While access to the far-class shown is shared by the two near-classes, it is contemplated that each near-class may instead be associated with its own corresponding far-class data structure.

In addition to far-class pointers, the near-classes 1110 and 1120 also comprise respective vtables 1114 and 1124. The vtable in the nascent near-class stores a list of pointers to nascent versions of a set of compiled methods. In this context, the nascent methods are compiled with minimal amounts of write-barrier overhead to thereby expedite the methods' execution. Each of the pointers stored in vtable 1114 addresses a memory location that stores an associated nascent method. Similarly, each of the pointers stored in vtable 1124 addresses a memory location that stores a mature method. For example, nascent versions of methods A and B (1130 and 1140) are referenced by pointers 1116 and 1118 in the nascent near-class, and mature versions of the same methods (1150 and 1160) are referenced by pointers 1126 and 1128 in the mature near-class. As used herein, the mature methods comprise more extensive use of write barriers than their nascent versions.

It should be noted that the pointers described herein are used to facilitate gaining access to, e.g., objects, data, methods, and other pointers. Therefore, it will be understood that a pointer, as broadly used in this disclosure, may facilitate gaining access to the contents of its stored memory address, or, alternatively, the value of the pointer may be used in combination with other ancillary information, such as known offsets, to facilitate gaining access to the contents of a different memory location. For example, the class pointer 1105 may comprise the logical memory address of near-class 1110, and consequently may be considered to "point" to that near-class. On the other hand, when used in combination with the relative offset of pointer 1116, the pointer 1105 may be considered to "point" to method A. Depending on how it is used, the class pointer can enable mutator code applied to object 1100 to access an individual method, a near-class, a far-class, etc.

Typically, memory space for a new object is allocated in a young generation, and the value contained in the object's class-pointer field 1105 references the object's nascent near-class (as shown in FIG. 11). However, a garbage collector may "promote" the object to a mature generation, e.g., based on its relative longevity in the heap. For instance, the collector may promote an object in a young generation after the object has "survived" a predetermined number of collection intervals, e.g., as indicated by a counter located in a designated field of the object or in some other memory location. When the object is moved to the mature generation, the contents of class pointer 1105 is re-written to reference the object's mature near-class (as indicated by the dotted arrow), and program counter values in the call stacks are modified to reflect that the object now implements mature methods.

Figure 12:
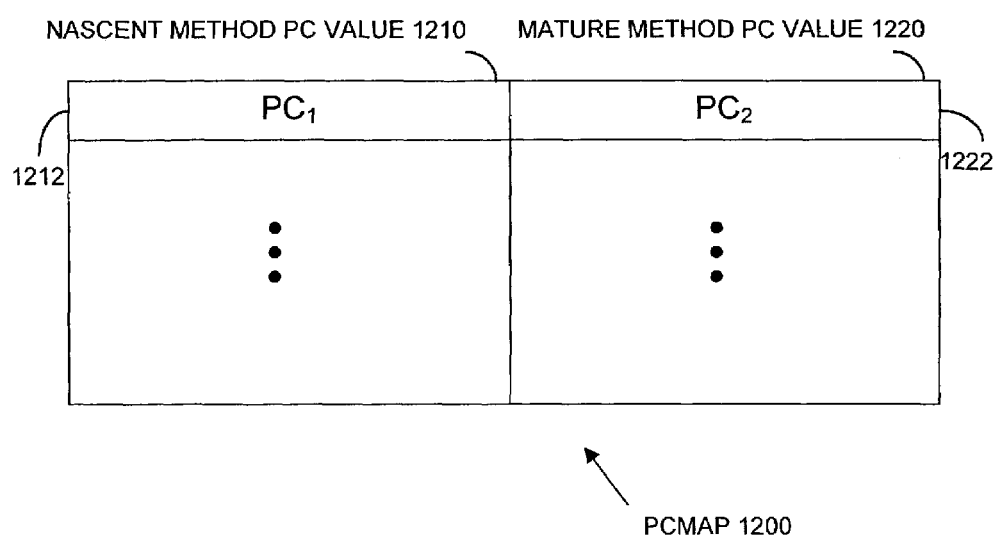
FIG. 12 is a schematic block diagram of an illustrative pcmap that may be used in conjunction with methods stored in the nascent and mature near-classes of FIG. 11.

To this end, the compiler can generate a program-counter map (pcmap) for each pair of nascent and mature methods. The pcmap comprises a mapping of program-counter (pc) values for functionally equivalent points in its associated nascent and mature methods. As shown in FIG. 12, a pcmap 1200 may be organized as a table having a column of nascent method pc values 1210 and a column of mature method pc values 1220. A first pc value 1212 ($PC_1$) of an instruction in the nascent method may correspond to a functionally equivalent second pc value 1222 ($PC_2$) in the mature method. Therefore, if a young-generation object is promoted just before the instruction at $PC_1$ is executed in the nascent method, the garbage collector can use the pcmap to modify the call stacks so that execution will resume at $PC_2$ in the mature method rather than at $PC_1$ in the nascent method.

In an illustrative embodiment, the nascent and mature methods are compiled using the same compilation techniques and optimizations, so the two versions differ only in their incorporation of write-barrier code. Therefore, the pcmap may map identical instructions in the nascent and mature methods simply by accounting for any offset due to write-barrier instructions present in one method and not the other. The advantages of this approach are simplicity of code and pcmap generation. In particular, it allows straightforward generation of multiple compiled versions of a given method in parallel as well as allowing one version of a compiled method to serve as a template for generating another version of the same method.

However, the nascent and mature methods may not be compiled using the same techniques. For example, write-barrier code in the mature method may require the compiler to allocate registers in a different manner than in the nascent method. Therefore, derivation of the pcmap may require use of one or more on-stack replacement techniques to equate pc values in the methods even when the methods do not contain identical instructions. One example of an on-stack replacement technique that may be employed is described in the technical paper entitled "*Debugging Optimized Code with Dynamic Deoptimization*," to Holzle et al., which is hereby incorporated by reference.

Since a pcmap is generally used to map nascent-method pc values to mature-method pc values, the pcmap may be stored with other metadata associated with the nascent near-class. As used herein, metadata associated with a method includes configuration and support information for the method. Illustratively, a pointer 1132 associated with nascent method 1130 references metadata 1134 which comprises a pcmap 1136 for method A. Likewise, a pointer 1142 associated with nascent method 1140 references metadata 1144 which comprises a pcmap 1146 for method B. Those skilled in the art will understand the metadata may be associated with nascent methods without explicit use of pointers, such as 1132 and 1142. Further, it is expressly contemplated that mature methods may similarly be associated with metadata data structures (not shown) where pcmaps could be stored that enable a mature method to revert to its nascent version. Additionally, metadata data structures for both the nascent and mature method versions may share access to the same pcmap.

Figure 13:
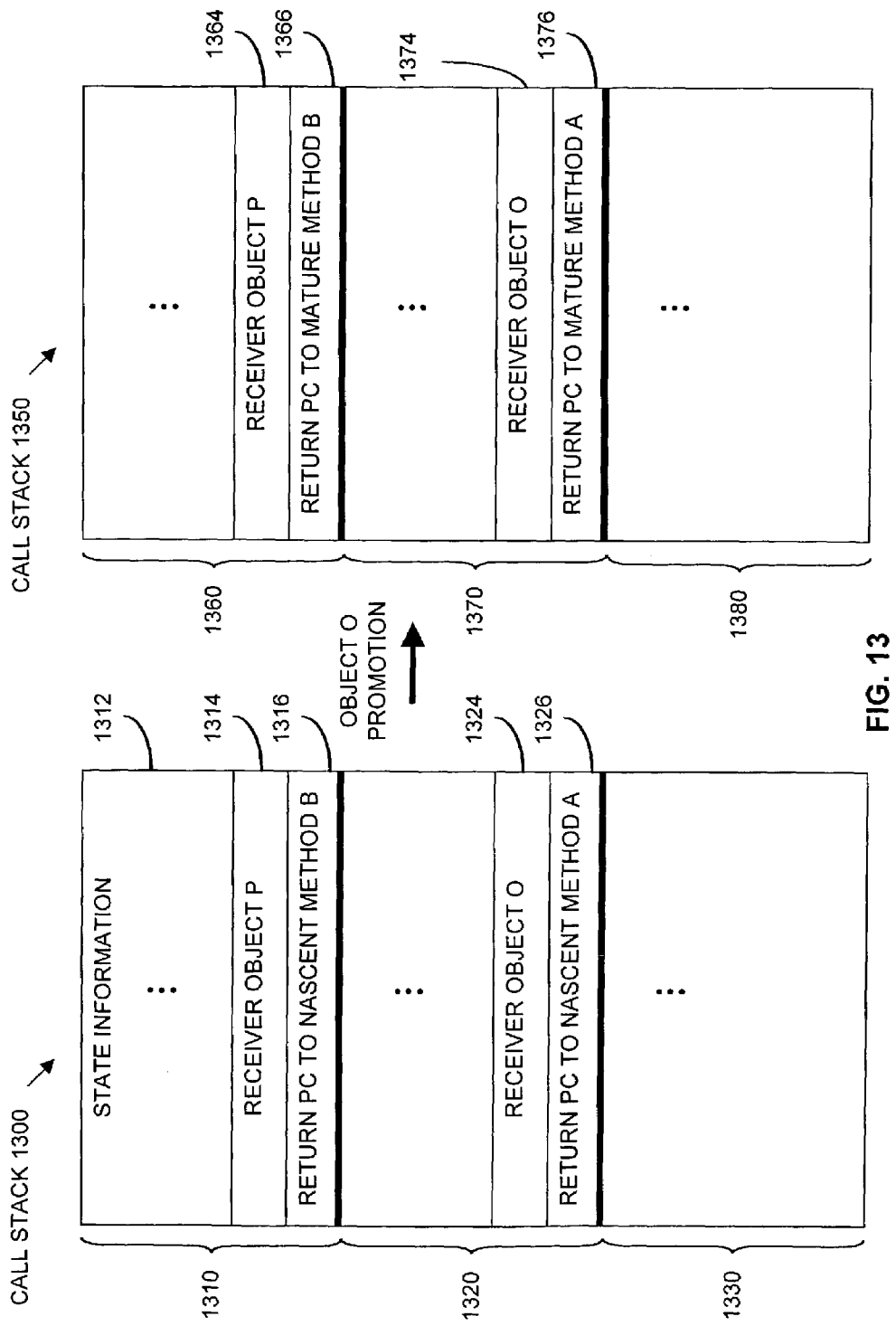
FIG. 13 is a schematic block diagram of an exemplary call stack, in accordance with the invention, which has its program counter values modified in response to an object's promotion from a young generation to a mature generation.

FIG. 13 illustrates an exemplary call stack 1300 having an ordered sequence of frames. Each of the frames stores state information 1312, such as registers' contents, local variable values and program-counter values, corresponding to a nested call within a process or thread. Typically, when a method is called within the process or thread, a frame is created in the call stack to store state information corresponding to when the method is called. For instance, assume a nascent method A associated with a stack frame 1330 is called through a young-generation object O. Further assume that an instruction in method A consequently calls a nascent method B through the object O. In this case, a frame 1320 in the call stack stores state information associated with the call to method B, including a field 1324 identifying the receiver object and a field 1326 storing the "return" pc value of the next instruction that will be executed when nascent method A resumes. In the same manner, if a call is made during execution of nascent method B, another frame 1310 is created comprising state information that includes a field 1314 identifying the receiver object (e.g., object P) and a field 1316 storing the next pc value to be executed in nascent method B. When a garbage-collection interval occurs, a context or an additional stack frame (not shown) may be created to store local state information, such as the current pc value, for the method whose execution was interrupted by the collector.

If the garbage collector promotes the young-generation object O to a mature generation, pc values in the call stack corresponding to nascent methods applied to object O are updated to reflect that the object O now implements mature methods. In addition, if the collector interrupts the mutator during execution of a nascent method called on by the promoted object O, then the current pc value is also updated so the mutator will resume execution in the mature version of the interrupted method. The collector may update the pc values using one or more pcmaps associated with the object's methods, thereby resulting in an updated call stack 1350. For example, the garbage collector may use pcmaps associated with methods A and B to replace the pc values 1326 and 1316 with their corresponding mature-method pc values 1376 and 1366. Thus, frames 1310 and 1320 are transformed to frames 1360 and 1370, respectively. In our illustrative embodiment, the receiver-object fields 1364 and 1374 and other state information in the updated call stack, including the contents of mature method A's stack-frame 1380, generally remain unaffected by the collector's changing the call-stack pc values 1326 and 1316 to reflect the fact that the object O is now the receiver of mature versions of methods. Of course, the information in the call stack 1350 may also be updated to reflect the fact that objects, such as the object O, may have been relocated to new memory locations during the collection interval.

Figure 14:
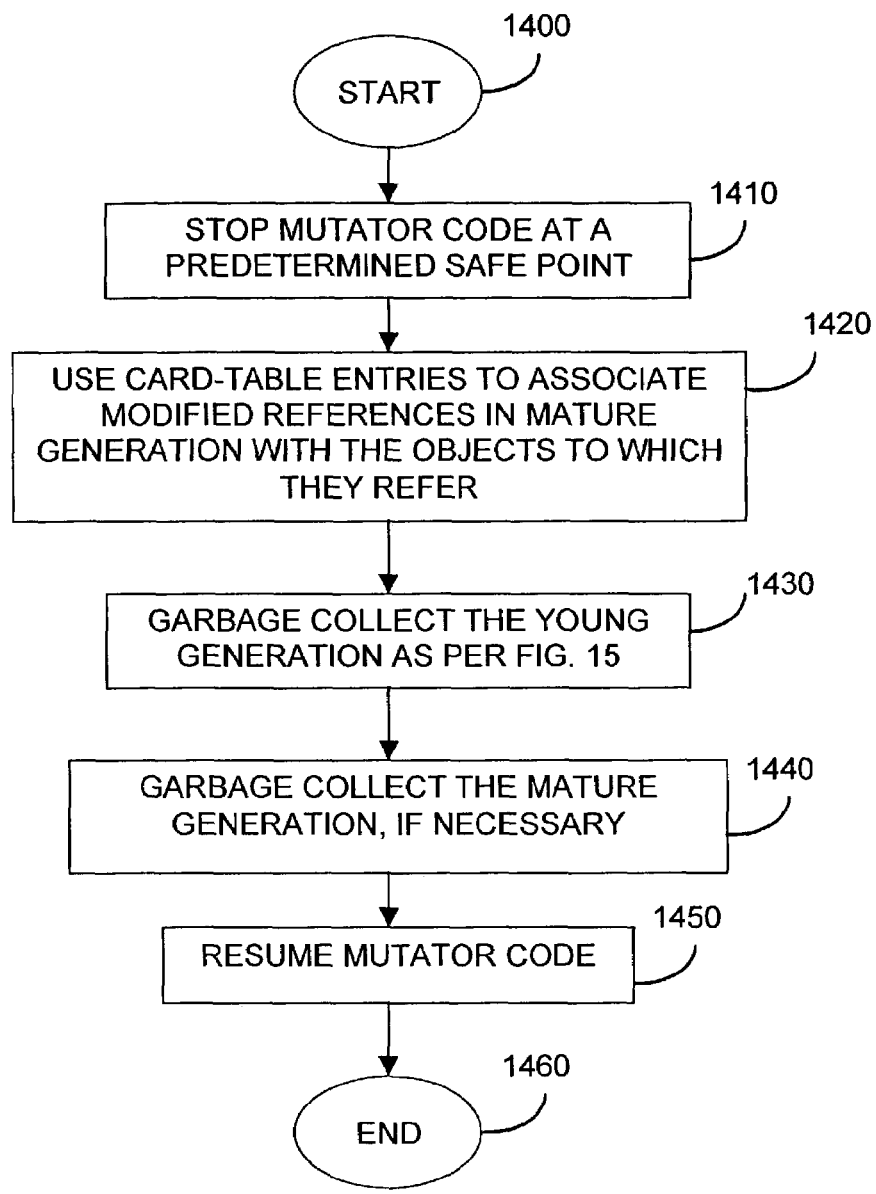
FIG. 14 is a flowchart illustrating a sequence of steps for garbage collecting objects in a heap.

FIG. 14 illustrates a sequence of steps that a computer system may perform in executing a garbage collection interval. The sequence starts at step 1400 and proceeds to step 1410, where the garbage collector interrupts the mutator code at a predetermined safe point. The safe point may correspond to a logical stopping point in the mutator code where the current process or thread is in a known state and the collector can more easily trace references into the heap. The compiler will have generated stack maps for various safe points to indicate where references are located in their associated stack frames and registers when the mutator reaches these safe points. Possible safe points may include backward branches, call returns, method preambles, etc. in each method.

Next, at step 1420, the garbage collector checks card-table entries associated with a mature generation to determine which areas of the generation comprise modified objects. The collector scans each modified area for references and associates the locations of the references thus found with the objects to which they refer. In a collector that collects the mature generation incrementally, e.g., in accordance with the train algorithm, the association operation may involve entering an identifier of the modified object's in a "remembered set" associated with the "car section" in which the referred-to object resides.

At step 1430, the garbage collector next collects the young generation, as will be described below in relation to FIG. 15. At step 1440, the garbage collector then implements a suitable garbage-collection algorithm to reclaim a portion of the mature generation after evacuating reachable objects from it. Alternatively, the garbage-collection algorithm may implement other collection techniques known in the art. Once the mature generation has been collected, the mutator code resumes at step 1450, and the sequence ends at step 1460.

Figure 15:
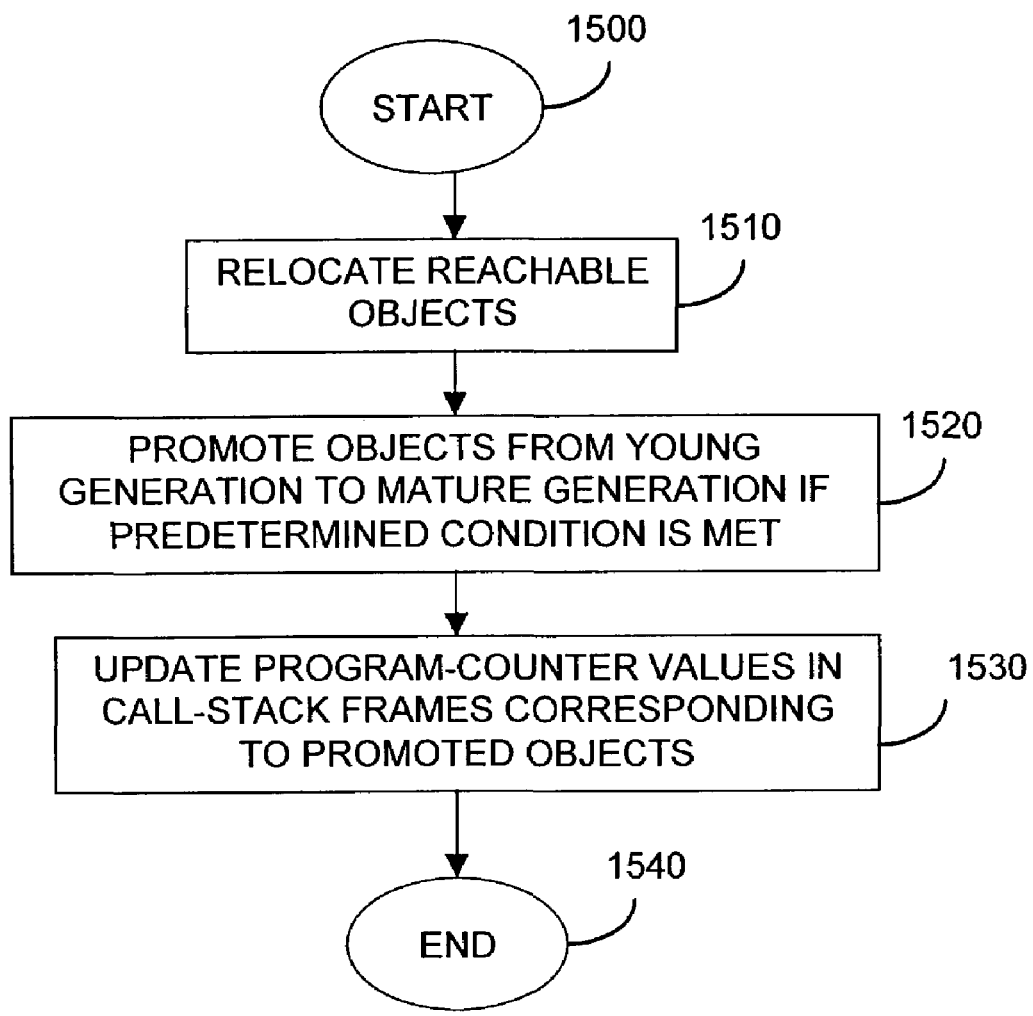
FIG. 15 is a flowchart illustrating a sequence of steps for promoting objects from a young generation to a mature generation as the garbage collector collects young generation objects.

FIG. 15 illustrates in more detail the step 1430 for collecting the young generation. The sequence starts at step 1500 and proceeds to step 1510, where the garbage collector identifies reachable objects and may relocate them from a portion of the young generation being reclaimed. At step 1520, the garbage collector may determine whether a reachable young-generation object meets a predetermined condition. If it does, the collector may move, or "promote," the object to a memory location in a mature generation. The predetermined condition may depend on the object's longevity in the heap. For instance, the collector may promote the object after a predetermined number of collection intervals, the object's "age" for this purpose being, e.g., stored by a counter located in a designated object field or other memory location. Program-counter values in call-stack frames corresponding to the promoted object are updated, e.g., using a pcmap, to coincide with the object's mature methods, at step 1530. The sequence ends at step 1540.

Some embodiments of the invention may change an object's class field between nascent and mature values in situations in which the object does not necessarily change generations; the fundamental determinant really is whether a write barrier is necessary, not where the reference is located. True, in the examples described above, write barriers do tend to be needed in the mature generation and not in the young generation. But the need for write barriers can come and go independently of the reference's location. For instance, there are times when the kind of methods associated with an object may switch, e.g., from nascent to mature, even though it is not relocated in memory or it remains in the same generation it occupied before the switch. In these cases, a list or table of such objects may be maintained to apprise the collector of where these objects are located should, for example, they need either to be scanned or to be reverted back. Likewise, objects relocated to a generation that tends to contain objects that use one kind of class pointer may defer their switch to that kind of class pointer if the collector is able to track them in a table, list, or by placing them in some set of designated memory locations known to the collector.

Suppose, for example, that the compiler can tell that a given reference, although modified between first and second successive safe points, is also part of an object that will become unreachable between those two safe points. In such a situation there is really no reason why write barriers should accompany that reference's modifications between those two safe points, even if the reference is located in the mature generation. So the compiler could include with other information for the first safe point a suggestion that, if the collector interrupts the mutator at the first safe point, the collector can switch the reference-containing object's class field from the mature value to the nascent value and thereby avoid the unnecessary write-barrier execution.

Figure 16:
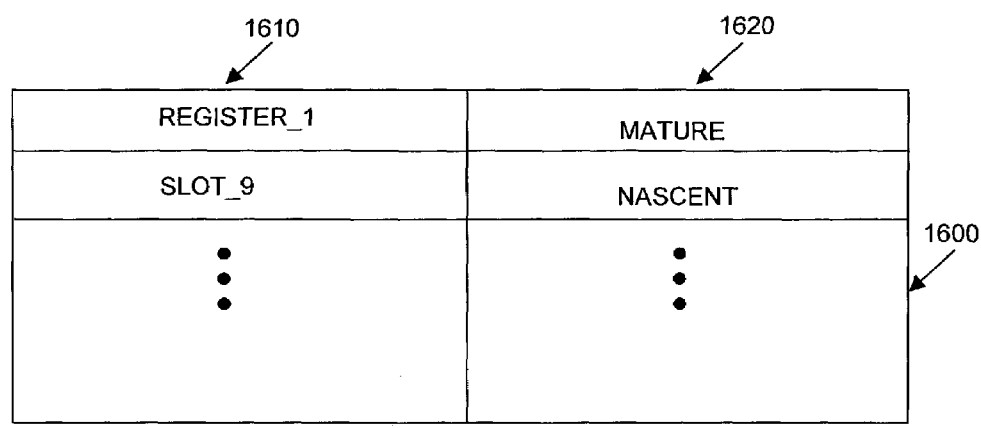
FIG. 16 is a schematic block diagram of an exemplary table of compiler "hints" that may be used by a collector when promoting objects.

Such suggestions for a given safe point could take the form of a two-column table such as the one depicted in FIG. 16, for example. That table's first column 1610 is a list of stack-frame slots and registers that contain references to objects to which the suggestions refer. The second column 1620 contains the suggestion, such as that the object's class field be given the nascent value or that it be given the mature value.

Also, the compiler may have the mutator rather than the collector make the switch between different method versions. In one such implementation, the compiler emits code that when executed by the mutator effects the change of an object's class-field value and subsequently notifies the collector of that change, e.g., by adding an identifier of the object to a list of objects that have been so modified by the mutator. In this manner, the compiler implements its suggestions through object code explicitly executed by the mutator, without having to generate safe-point information, such as the table 1600, that communicates the compiler's suggestions to the collector.

The compiler may have the change between different method versions be made in other situations besides those previously described. For example, suppose that during compilation the compiler determines an object soon will be subjected to a burst of frequent modifications. This would normally necessitate the expense of frequent write barriers. But the compiler could avoid that necessity by including a suggestion that places an identifier of the object or region that contains the object, into a must-scan list, i.e., a list of places that the collector will scan on every collection interval independently of whether a write barrier has alerted the collector to their having been modified. With the need for those write barriers thus eliminated, the compiler could also emit code that places the nascent value in the caller object's class field and thereby eliminate some unnecessary write-barrier executions. After the burst of modifications, the compiler may direct that the object be taken off the list and that the collector, for example at the next collection interval, will restore the object's class field to its mature value. Further, the compiler may also direct that the object's memory is subsequently marked as having been modified.

Similarly, if the compiler concludes that a reference-containing object is likely, but not certain, to soon become unreachable in the mutator code, it could include a suggestion that the location of a reference to that object be placed on a scan-if-still-alive list and that the object's class field be given the nascent value. This suggestion may be adopted if the collector will be able to determine at subsequent safe points whether the object is still reachable. Thus, if the collector performs a collection interval at a later safe point, it will consult the scan-if-still-alive list and thereby note that the object's reference may have been modified without the benefit of a write barrier. If it also sees that the object has become unreachable, it can avoid scanning the reference contained by the object and avoid recording the reference's location against the object to which it refers.

While the implementation described above ensures that the mutator always executes the compiler's suggestions, the compiler may also emit mutator code that executes the compiler's suggestions only when certain runtime conditions are satisfied. Such runtime conditions may depend on the state of the garbage collector, the heap state, available system resources, and so forth. For example, the compiler may emit code to call a runtime function that determines whether or not to switch the object's class-field value from a first value to a second value depending on whether one or more runtime conditions are met. If the requisite conditions are satisfied, the runtime function switches the object's class-field value and subsequently notifies the collector that the class-field value has been switched. Again, in this case, the compiler implements its suggestions through object code explicitly emitted in the mutator without having to supply safe-point information that communicates its suggestions to the collector.

B. Reference-Writes to Non-Receiver Objects

As per FIGS. 11–16, a compiler may generate nascent and mature versions of a method as well as a pcmap for mapping the locations of functionally equivalent instructions in the versions, e.g., in case an object is promoted from a young generation to a mature generation (or vice versa). The nascent versions of most methods contain no write barriers at all. The reason for this is that the majority of reference-modifying methods modify only references located in the receiver object, and the nascent version of a method is called only when modifications of the caller's member references do not need to be reported by write barriers.

Still, some nascent methods do modify references in non-receiver objects. Such objects may be located in the mature generation, so the nascent method may have to implement write barriers to inform the garbage collector where these reference-writes were made, e.g., by marking appropriate card-table entries. Such non-receiver objects may include, inter alia, objects passed as arguments to the method, objects allocated and initialized by the method, and objects referred to by such objects.

More generally, references in non-receiver objects modified in nascent and mature methods may reside in either the young or the mature generation. The compiler ordinarily does not know at compile time whether a non-receiver object in the mutator code will reside in a young or mature generation. Thus, a simple solution for implementing write barriers after reference-writes to non-receiver objects is to include a write-barrier sequence, in both nascent and mature methods, after every reference-write to a non-receiver object. Although this simple strategy ensures write barriers are always executed after reference-writes to mature-generation non-receiver objects, the strategy may result in unnecessary write-barrier code executed after reference-writes to young-generation non-receiver objects.

A "code-splitting" strategy may instead be implemented (using "guard" code) both in nascent and in mature methods after a reference in a non-receiver object is modified. The first instruction in a guard-code sequence checks whether the modified non-receiver object has a nascent near-class, thereby obviating unnecessary write-barrier operations after reference-writes in non-receiver objects that rely on nascent methods. The guard-code may be implemented, e.g., as a procedure call or, more typically, as inlined code.

FIG. 17 is an exemplary source-code listing that illustrates modification of a reference in a non-receiver object. Each object instantiated in a class C contains references f and g (lines 3–4) and also provides access to a method "foo" (lines 5–7) that takes a single argument: a non-receiver object x, which for the sake of example is an instance of the class C. At line 6, x's reference f is modified to equal the receiver object's reference g. In other words, a reference in non-receiver object x is modified at line 6.

FIG. 18 shows an exemplary assembly-language version of a reference modification (x.f-ref) followed by guard-code instructions that include CALL instructions that are possible safe points where the collector may interrupt the mutator. More specifically, the mutator executes the reference modification at line N+1, then executes a guard-code instruction at line N+3 to determine whether the modified non-receiver object x has a nascent near-class. In this example, the guard code performs a logical AND operation on a class field value in the object x and sets a predetermined status bit, or "condition code," if the result of the AND operation is zero. Here, it is assumed the compiler is configured to store all nascent near-classes at memory addresses having their third least-significant bit (e.g., hexadecimal value 0×04) set to "0." Similarly, the compiler is configured to store all mature near-classes at memory addresses having their third least-significant bit set to "1." Thus, if the non-receiver object's near-class is nascent, then the result of the AND operation at line N+3 is zero and the code branches (BRZ) to the "Is_nascent" label at line N+15. On the other hand, if the object's near-class is mature, the mutator code does not branch at line N+4 and instead continues to the CALL instruction at line N+7. Of note, the NOP (no operation) instruction at line N+5 may be included for traditional delay-slot architectures.

The guard-code instructions at lines N+3 through N+5 may follow more than one reference-modifying instruction in the mutator code, and therefore a plurality of corresponding write barriers may be "guarded" by the same guard-code instructions. Further, the code following the guard-code sequence also may include other instructions in addition to write barriers. Those skilled in the art will appreciate the various ways in which the guard code may be implemented to test whether the non-receiver object x has a nascent near-class. For example, the test may be based on the memory address of the object x, the memory address of object x's near-class, a flag or field value stored in object x's near-class, a header pattern stored in object x's near-class, and so forth.

In some cases in which the garbage collector interrupts mutator execution at a safe-point located in the guard-code sequence, such as at the CALL instructions at lines N+7 and N+17, the collector may switch the write-barrier technique of a non-receiver object in the guard-code sequence, e.g., as a result of the object being promoted from one generation to another. When this happens, the mutator code may have to resume in a different branch of the guard-code sequence than where it was interrupted. For example, if a young-generation non-receiver object x has a nascent near-class at line N+3, then the mutator code is directed to the "Is_nascent" label at line N+15 without executing the write barrier at lines N+9 through N+12. However, if the garbage collector interrupts the mutator code at line N+17's safe point and promotes object x to a mature generation, then the object will no longer have a nascent near-class when the mutator resumes. Therefore, after the collection interval completes, the mutator code execution needs to resume at line N+7 instead of line N+17 to ensure the write barrier at lines N+9 through N+12 is executed.

Figure 19:
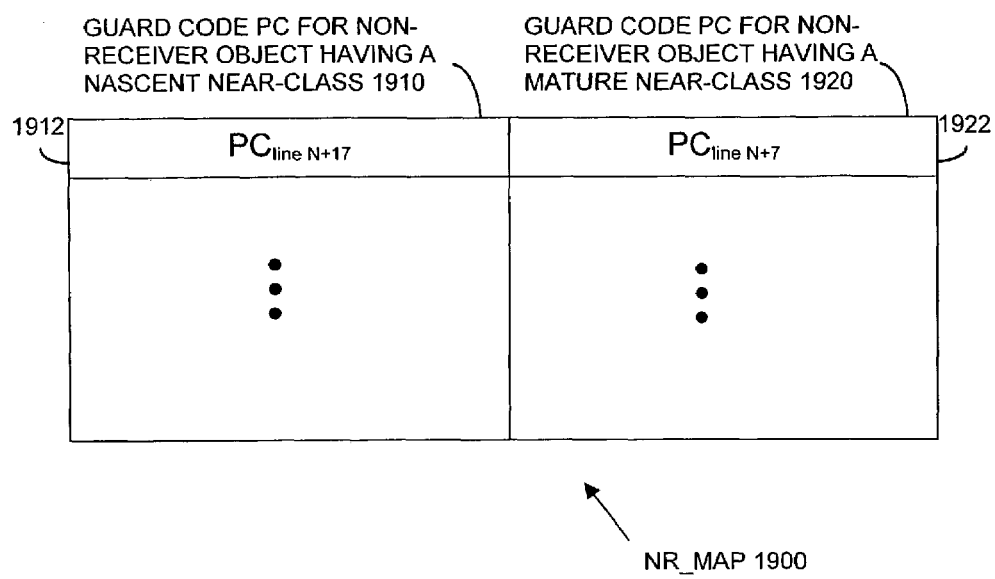
FIG. 19 is a schematic block diagram of an illustrative nr_map that may be used in conjunction with guard code of FIG. 18.

A non-receiver program counter map (nr_map) may be generated, e.g., by the compiler, for each method that implements a guard-code sequence including one or more possible safe points. The nr_map facilitates mapping program counter (pc) values for functionally equivalent points within different branches of guard-code sequences. As shown in FIG. 19, an nr_map 1900 may be organized as a table having a column 1910 corresponding to guard-code pc values for non-receiver objects having nascent near-classes and a column 1920 of guard code pc values for non-receiver objects having mature near-classes. For example, a first pc value 1912 ($PC_{line\ N+17}$) in the guard code may correspond to a functionally equivalent instruction having a second pc value 1922 ($PC_{line\ N+7}$) in a different branch of the guard code. Therefore, if the collector interrupts FIG. 18's guard code to promote a young-generation non-receiver object x just before execution of the CALL instruction at line N+17, the garbage collector can use the nr_map to make the method execute a write barrier by resuming the method's execution at line N+7 instead of resuming the method's execution at line N+17.

Figure 20:
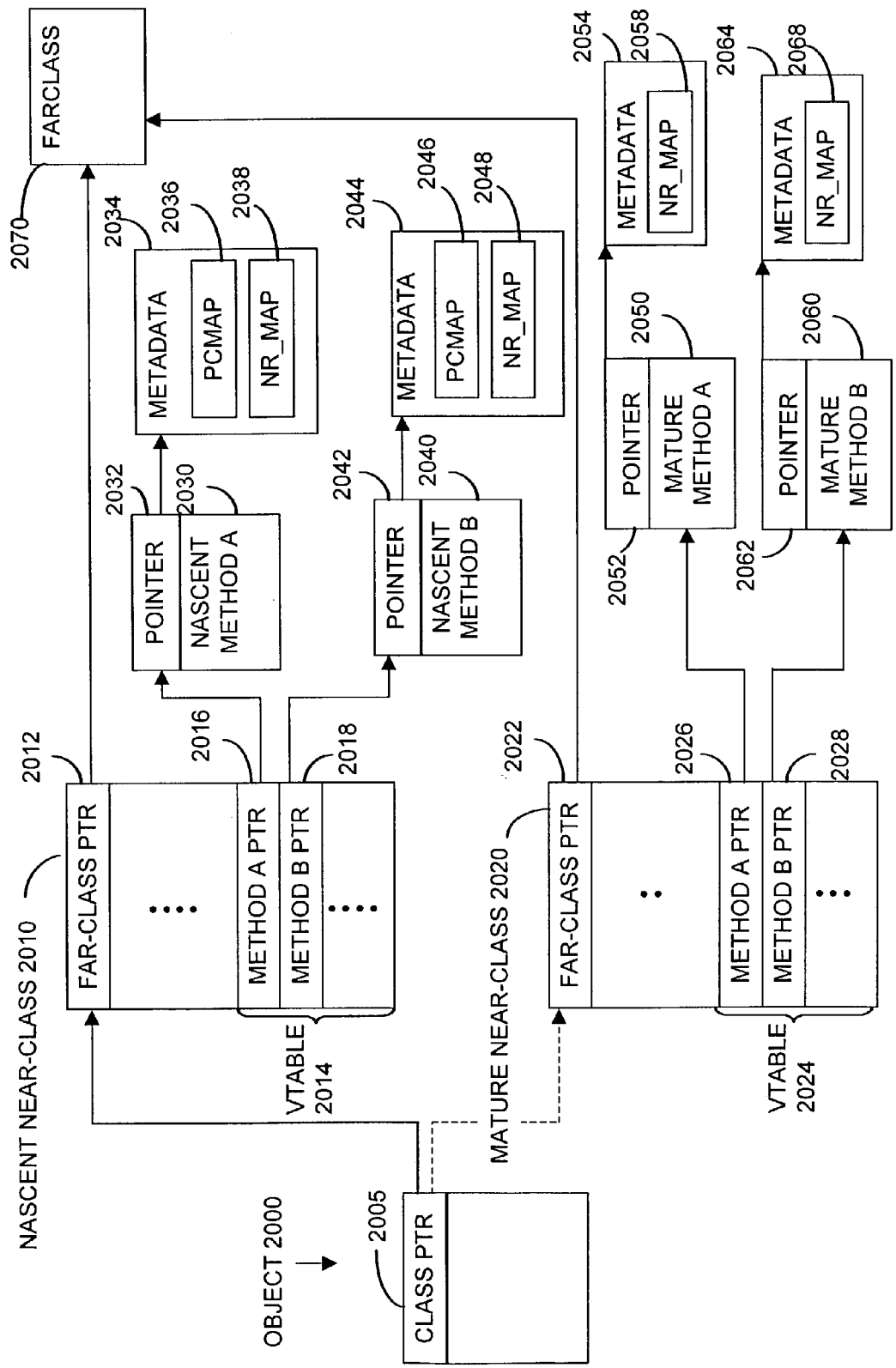
FIG. 20 is a schematic block diagram illustrating nr_maps for methods associated with a nascent near-class and mature near-class, as set forth in the invention.

Since nascent and mature method versions may both implement guard-code sequences, a separate nr_map may be associated with each version. FIG. 20 illustrates a more detailed schematic block diagram of FIG. 11, showing nr_maps stored in metadata data structures associated with nascent and mature versions of methods A and B. An object 2000 includes a class pointer 2005 that references a nascent near-class 2010 or, alternatively, may reference a mature near-class 2020 (as shown by the dotted line). Both near-classes 2010 and 2020 comprise, among other things, a far-class pointer (2012 and 2022) to far-class 2070 and respective vtables. The nascent near-class vtable 2014 stores a plurality of pointers (e.g., 2016 and 2018) to compiled nascent methods, and the mature near-class vtable 2024 stores a plurality of pointers (e.g., 2026 and 2028) to compiled mature methods. As previously described in the discussion of FIG. 11, a pointer, as broadly used herein, may facilitate gaining access to its stored memory address, or alternatively the contents of the pointer may be used in combination with other ancillary information to facilitate gaining access to a different memory location.

Each of the methods 2030, 2040, 2050 and 2060 referenced by the pointers in vtables 2014 and 2024 may comprise a respective pointer (2032, 2042, 2052 and 2062) to an associated metadata data structure. As previously discussed, the metadata data structures (2034 and 2044) corresponding to nascent methods may comprise pcmaps, such as pcmaps 2036 and 2046. In addition, the metadata structures may also store nr_maps, such as nr_maps 2038 and 2048, for their associated nascent methods. Similarly, metadata data structures (2054 and 2064) associated with the mature methods may comprise respective nr_maps, such as nr_maps 2058 and 2068.

Figure 21:
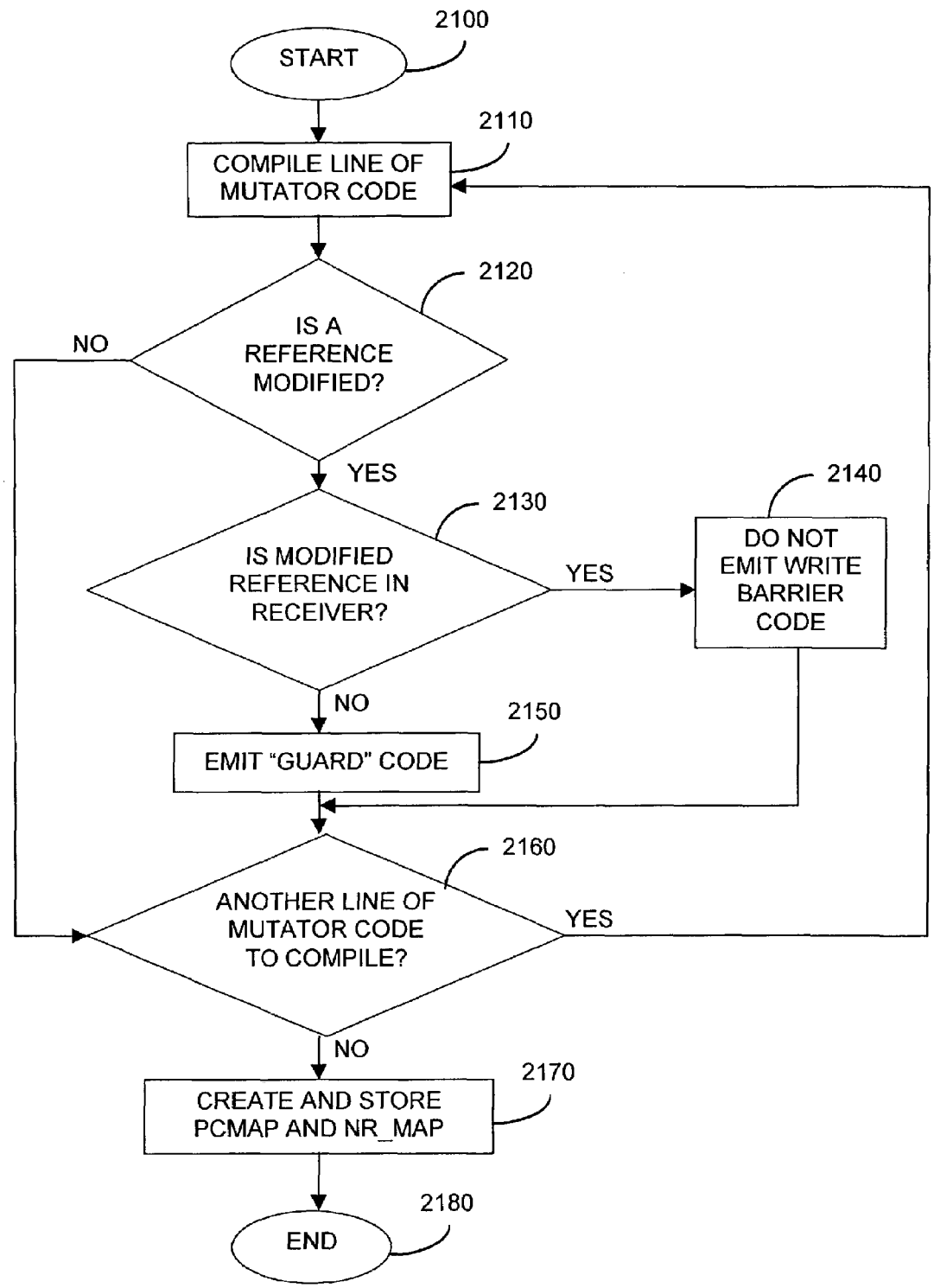
FIG. 21 is a flowchart illustrating a sequence of steps in accordance with the present invention for compiling a nascent version of a method.

FIG. 21 illustrates a sequence of steps for compiling a nascent version of a method. The sequence starts at step 2100 and proceeds to step 2110, where a line of mutator code is compiled. In the illustrative embodiment, the mutator code is compiled on a byte code by byte code basis, although the compiler may compile other intermediate representations of the line of mutator code at step 2110 as well. Steps 2120–2150 analyze the line of mutator code to determine whether to emit a write barrier or guard code sequence. Specifically, at step 2120, the compiler determines whether the compiled line modifies a reference in an object. If a reference is not modified, the sequence proceeds to step 2160. If a reference is modified, at step 2130 the compiler checks whether the modified reference is located within a receiver object.

Upon determining the reference modification is made to a receiver object, at step 2140, no write barrier is added to the nascent method. On the other hand, if the reference modification is made to a non-receiver object, then at step 2150 the compiler emits appropriate guard code corresponding to the reference modification. Using a simple write barrier strategy, the compiler may emit write barrier code instead of guard code at step 2150. Next, at step 2160, the compiler determines whether there is another line of mutator code to compile for the nascent method. If there is another line, the sequence returns to step 2110. Otherwise, the compiler creates a pcmap and nr_map associated with the nascent method, at step 2170, and stores the maps in appropriate locations, such as in a metadata data structure associated with the method. The sequence ends at step 2180.

Figure 22:
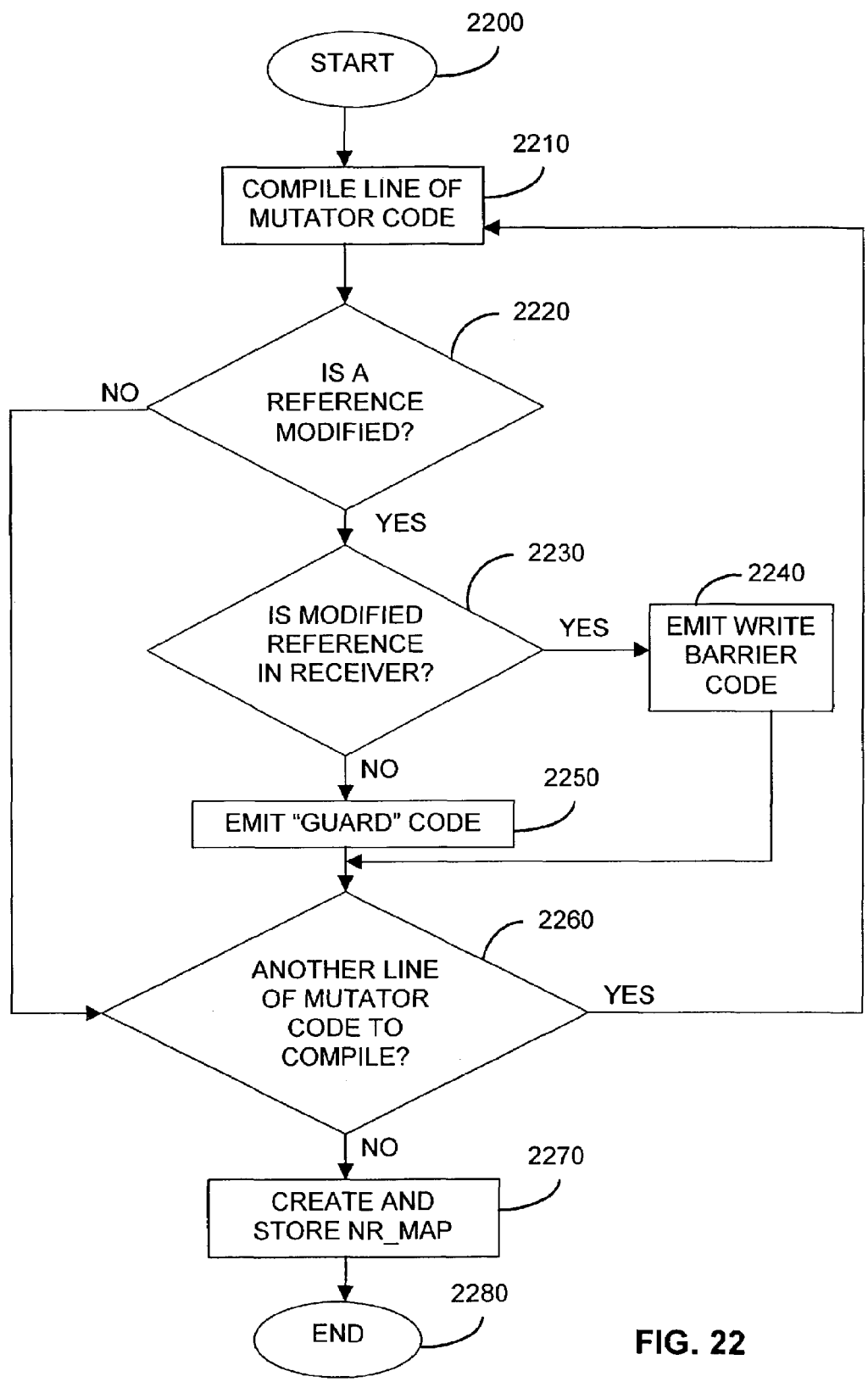
FIG. 22 is a flowchart illustrating a sequence of steps in accordance with the present invention for compiling a mature version of a method.

FIG. 22 illustrates a sequence of steps for compiling a mature version of a method. Preferably, the mature method is compiled concurrently with its corresponding nascent version. Alternatively, the mature method may be derived from its nascent version, or vice versa. That is, the two versions differ only in their use of write-barrier code, which may be added or extracted from one of the compiled versions to create the other. The sequence starts at step 2200 and proceeds to step 2210, where a line of mutator code is compiled. As described with regards to FIG. 21, the line of mutator code may be a byte code or other intermediate representation of one or more instructions in the mutator code. At step 2220, the compiler determines whether the compiled line modifies a reference in an object. If a reference is not modified, the sequence proceeds to step 2260. If a reference is modified, at step 2230 the compiler checks whether the modified reference is located within a receiver object.

Upon determining the reference modification is made to a receiver object, at step 2240, a write barrier corresponding to the compiled line of mutator code is included in the mature method. On the other hand, if the reference modification is made to a non-receiver object, then at step 2250 the compiler emits the appropriate guard code corresponding to the reference modification. Using a simple write-barrier strategy, the compiler may emit write barrier code instead of guard code at step 2250. Next, at step 2260, the compiler determines whether there is another line of mutator code to compile for the mature method. If there is another line, the sequence returns to step 2210. Otherwise, the compiler creates an nr_map associated with the mature method, at step 2270, and stores the map in an appropriate location, such as in a metadata data structure associated with the method. The sequence ends at step 2280.

C. Conclusion

The foregoing has been a detailed description of an illustrative embodiment of the invention. Various modifications and additions can be made without departing from the spirit and scope of the invention. For example, although objects are typically "promoted" from a young generation to a mature generation, the principles and teachings herein are equally applicable to promoting objects from a mature generation to a young generation. That is, when an object is moved from a mature generation to a young generation, a class pointer may be appropriately updated and a pcmap may be used to map pc values from the object's mature method to functionally equivalent points in a corresponding nascent method.

A young generation is usually completely scanned so the garbage collector only relies on write barriers for reference modifications in objects located in the mature generation. However, the present invention equally applies for those situations where the mature generation is fully scanned and the collector relies on write barriers only in the young generation. More generally, the principles and teachings herein may apply whenever an object is passed between a state in which a first write-barrier approach is used to notify the collector of reference modifications of that object and a state in which a second write-barrier approach is implemented. Furthermore, the objects described herein may include arrays and array-like objects often employed by those skilled in the art.

It is also expressly contemplated that a nascent near-class and its associated mature near-class may be stored in a common data structure. The nascent and mature near-classes may be appended or otherwise combined into a single data structure as understood by those skilled in the art. In addition, the metadata data structure associated with each method may be directly incorporated (appended, prepended, etc.) to the memory location of its associated method.

The teachings set forth herein are equally applicable to various embodiments of the mutator code as well as different combinations of compiling and interpreting operations applied to the mutator code. For example, a method may be re-compiled to a faster version after it has been executed a predetermined number of times. Alternatively, generation of different versions of a mutator method may be deferred until the original method has been executed a predetermined number of times. Operationally, the number of times a method has been executed may be indicated, e.g., by a counter located in metadata associated with the method or in a known memory location accessible to the compiler. As previously described, the compiled mutator code herein may be any combination of interpreted and compiled code that may be executed by a processor. Also, it is contemplated that some mutator methods may be compiled having different versions, as described herein, while other mutator methods are compiled into a single version.

While the illustrative embodiment compiles two versions of a mutator method, one comprising more write barriers than the other, the inventive concepts herein also apply when the two versions differ in the type of write barriers employed. The type of write barrier may depend on the kind write-barrier operations performed during a collection interval. For example, different "phases" of garbage collection may necessitate different write-barrier operations. Thus, the compiler may compile two versions of a mutator method, in accordance with the invention, where the versions differ in the type of write barriers emitted by the compiler. Moreover, the compiler may compile more than two versions of a method to accommodate two or more of such collection "phases."

It is expressly contemplated that the teachings of this invention can be implemented as software, including a computer-readable medium having program instructions executing on a computer, hardware, firmware, or any combination thereof. The software may be embodied as electromagnetic signals by which computer instructions can be communicated. Accordingly this description is meant to be taken only by way of example and not to limit the scope of the invention.

What is claimed is:

1. In a computer system, a method for controlling the execution of write-barrier program code when a mutator program calls a reference-modifying method of a receiver object via a class pointer field, the method comprising:
    A) including in the receiver object, both a first method version with first write-barrier code and a second method version with second write-barrier code that differs from the first write-barrier code;
    B) before a predetermined condition is met, storing a first pointer in the class pointer field so that a subsequent call to the receiver object method follows the first pointer and executes the first method version; and
    C) after the predetermined condition is met, storing a second pointer in the class pointer field so that a subsequent call to the receiver object method follows the second pointer and executes the second method version.

2. The method according to claim 1, wherein the first and second versions contain different numbers of write barriers.

3. The method according to claim 2, wherein the first version contains no write barriers.

4. The method according to claim 1, further comprising:
generating a pcmap associated with the class-member method, the pcmap defining a correspondence between program-counter values of instructions in the first version of the class-member method and program-counter values of instructions in the second version of the class-member method.

5. The method according to claim 4, further comprising:
using the generated pcmap to update a program-counter value in a stack frame that corresponds to a call of the class-member method on the receiver object.

6. The method according to claim 4, further comprising:
storing the pcmap in a metadata data structure associated with the first or second version of the class-member method.

7. The method according to claim 1, further comprising:
generating an nr_map for each of the first and second versions of the class-member method, the generated nr_maps being used to map program-counter values of instructions located in different branches of guard code implemented in the first and second versions of the class-member method to each other.

8. The method according to claim 7, further comprising:
using one of the generated nr_maps to update a program-counter value that corresponds to the next instruction that will be executed by the mutator.

9. The method according to claim 7, further comprising:
storing each generated nr_map in a metadata data structure associated with the nr_map's corresponding version of the class-member method.

10. The method according to claim 1, wherein the predetermined condition is based on the object's longevity in a region of the memory.

11. The method according to claim 1, wherein the predetermined condition is based on a runtime condition.

12. The method according to claim 1, wherein the predetermined condition is based on information generated at compile-time.

13. The method according to claim 12, wherein the information generated at compile-time is based on the object's expected lifetime in the heap.

14. The method according to claim 12, wherein the information generated at compile time is based on the number of expected reference modifications made in the object.

15. A computer system for controlling the execution of write-barrier program code when a mutator program calls a reference-modifying method of a receiver object via a class pointer field, the system comprising:
a processor; and
a computer-readable memory that stores program instructions executable by the processor for
A) including in the receiver object, both a first method version with first write-barrier code and a second method version with second write-barrier code that differs from the first write-barrier code;
B) before a predetermined condition is met, storing a first pointer in the class pointer field so that a subsequent call to the receiver object method follows the first pointer and executes the first method version; and
C) after the predetermined condition is met, storing a second pointer in the class pointer field so that a subsequent call to the receiver object method follows the second pointer and executes the second method version.

16. The system according to claim 15, wherein the first and second versions contain a different number of write barriers.

17. The system according to claim 16, wherein the first version contains no write barriers.

18. The system according to claim 15, wherein the computer-readable memory further stores instructions executable by the processor for:
generating a pcmap associated with the class-member method, the pcmap defining, a correspondence between program-counter values of instructions in the first version of the class-member method and program-counter values of instructions in the second version of the class-member method.

19. The system according to claim 18, wherein the computer-readable memory further stores instructions executable by the processor for:
using the generated pcmap to update a program-counter value in a stack frame that corresponds to a call of the class-member method on the receiver object.

20. The system according to claim 18, wherein the computer-readable memory further stores instructions executable by the processor for:
storing the pcmap in a metadata data structure associated with the first or second version of the class-member method.

21. The system according to claim 15, wherein the computer-readable memory further stores instructions executable by the processor for:
generating an nr_map for each of the first and second versions of the class-member method, the generated nr_maps being used to map program-counter values of instructions located in different branches of guard code implemented in the first and second versions of the class-member method to each other.

22. The system according to claim 21, wherein the computer-readable memory further stores instructions executable by the processor for:
using one of the generated nr_maps to update a program-counter value that corresponds to the next instruction that will be executed by the mutator.

23. The system according to claim 21, wherein the computer-readable memory further stores instructions executable by the processor for:
storing each generated nr_map in a metadata data structure associated with the nr_map's corresponding version of the class-member method.

24. The system according to claim 15, wherein the predetermined condition is based on the object's longevity in a region of the memory.

25. The system according to claim 15, wherein the predetermined condition is based on a runtime condition.

26. The system according to claim 15, wherein the predetermined condition is based on information generated at compile-time.

27. The system according to claim 26, wherein the information generated at compile-time is based on the object's expected lifetime in the heap.

28. The system according to claim 26, wherein the information generated at compile-time is based on the number of expected reference modifications made in the object.

29. An apparatus operable in a computer system having a memory for controlling the execution of write-barrier program code when a mutator program executing in the memory calls a reference-modifying method of a receiver object via a class pointer field, the apparatus comprising:

means for inserting a first method version into the receiver object with first write-barrier code and for inserting a second method version into the receiver object with second write-barrier code that differs from the first write-barrier code;

means, operable before a predetermined condition is met, for storing a first pointer in the class pointer field so that a subsequent call to the receiver object method follows the first pointer and executes the first method version; and means, operable after the predetermined condition is met, for storing a second pointer in the class pointer field so that a subsequent call to the receiver object method follows the second pointer and executes the second method version.

30. The apparatus according to claim 29, further comprising:

means for generating a pcmap associated with the class-member method, the pcmap defining a correspondence between program-counter values of instructions in the first version of the class-member method and program-counter values of instructions in the second version of the class-member method.

31. The apparatus according to claim 30, further comprising:

means for using the generated pcmap to update a program-counter value in a stack frame that corresponds to a call of the class-member method on the receiver object.

32. The apparatus according to claim 30, further comprising:

means for storing the pcmap in a metadata data structure associated with the first or second version of the class-member method.

33. The apparatus according to claim 29, further comprising:

means for generating an nr_map for each of the first and second versions of the class-member method the generated nr_maps being used to map program-counter values of instructions located in different branches of guard code implemented in the first and second versions of the class-member method to each other.

34. The apparatus according to claim 33, further comprising:

means for using one of the generated nr_maps to update a program-counter value that corresponds to the next instruction that will be executed by the mutator.

35. The apparatus according to claim 33, further comprising:

means for storing each generated nr_map in a metadata data structure associated with the nr_map's corresponding version of the class-member method.

* * * * *